US012115780B2

(12) United States Patent
Ota

(10) Patent No.: US 12,115,780 B2
(45) Date of Patent: Oct. 15, 2024

(54) PRINTER AND TAPE FOR ACCURATELY DETECTING POSITION OF MARK ON THE TAPE

(71) Applicant: BROTHER KOGYO KABUSHIKI KAISHA, Nagoya (JP)

(72) Inventor: Yoshihiro Ota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 110 days.

(21) Appl. No.: 17/196,068

(22) Filed: Mar. 9, 2021

(65) Prior Publication Data

US 2021/0300077 A1 Sep. 30, 2021

(30) Foreign Application Priority Data

Mar. 25, 2020 (JP) ................................ 2020-053895

(51) Int. Cl.
*B41J 11/46* (2006.01)
*B41J 15/04* (2006.01)

(52) U.S. Cl.
CPC ............ *B41J 11/46* (2013.01); *B41J 15/048* (2013.01)

(58) Field of Classification Search
None
See application file for complete search history.

(56) References Cited

U.S. PATENT DOCUMENTS 6,302,510 B1 * 10/2001 Yoshida .................. B41J 29/13 347/19
2007/0059084 A1 3/2007 Matsumoto et al.
2010/0026738 A1 2/2010 Saikawa et al.
2014/0152753 A1 * 6/2014 Moriyama ............ B42D 15/00 347/110
(Continued)

FOREIGN PATENT DOCUMENTS

CN 1923523 A 3/2007
CN 101638010 A 2/2010
(Continued)

OTHER PUBLICATIONS

The extended European Search Report for the related European Patent Application No. 21163262.5 dated Jul. 27, 2021.
(Continued)

*Primary Examiner* — Matthew G Marini
(74) *Attorney, Agent, or Firm* — KENEALY VAIDYA LLP

(57) ABSTRACT

A printer includes a conveyor to convey a tape having a plurality of marks in a conveyance direction, the marks including a first mark, and a second mark formed downstream of the first mark in the conveyance direction, a print head to print an image on the tape, a reflection sensor to detect the marks on the tape by emitting light toward the tape and receiving reflected light from the tape, and output a detection signal according to the reflected light when detecting the marks, and a controller. The controller is configured to set a threshold to be variable based on a level of the
(Continued)

detection signal when the reflection sensor detects the second mark, and identify a position of the first mark based on a result of comparison between the threshold and a level of the detection signal when the reflection sensor detects the first mark.

13 Claims, 16 Drawing Sheets

(56) References Cited

U.S. PATENT DOCUMENTS

| | | | |
|---|---|---|---|
| 2015/0029291 A1 | 1/2015 | Nakajima et al. | |
| 2015/0034715 A1* | 2/2015 | Moriyama | B41J 11/46 235/494 |
| 2016/0052316 A1 | 2/2016 | Todaka | |
| 2017/0210157 A1 | 7/2017 | Obara | |
| 2018/0250973 A1 | 9/2018 | Inoue et al. | |
| 2018/0272758 A1* | 9/2018 | Hori | B41J 11/0095 |
| 2019/0084323 A1* | 3/2019 | Murayama | B41J 3/4075 |

FOREIGN PATENT DOCUMENTS

| | | | |
|---|---|---|---|
| CN | 105383193 A | | 3/2016 |
| JP | H11-91146 A | | 4/1999 |
| JP | 2004-82738 A | | 3/2004 |
| JP | 2005-178093 A | | 7/2005 |
| JP | 2007-090677 A | | 4/2007 |
| JP | 2008238606 A | * | 10/2008 |
| JP | 2015-024505 A | | 2/2015 |
| JP | 2015-030141 A | | 2/2015 |
| JP | 2017-132087 A | | 8/2017 |
| JP | 2018-146646 A | | 9/2018 |
| JP | 2019-055860 A | | 4/2019 |
| WO | 2011-146603 A2 | | 11/2011 |

OTHER PUBLICATIONS

The Communication Pursuant to Article 94(3) EPC for the related European Patent Application No. 21163262.5 dated Jan. 13, 2023.
The Notice of Reasons for Refusal for the Japanese counterpart application No. 2020-053895 dated Sep. 22, 2023.
The Notice of Reasons for Refusal for the related Japanese Patent Application No. 2020-053895 dated Jan. 19, 2024.
Chinese Office Action for the related Chinese Patent Application No. 202110267549.7 dated Aug. 8, 2024.

* cited by examiner

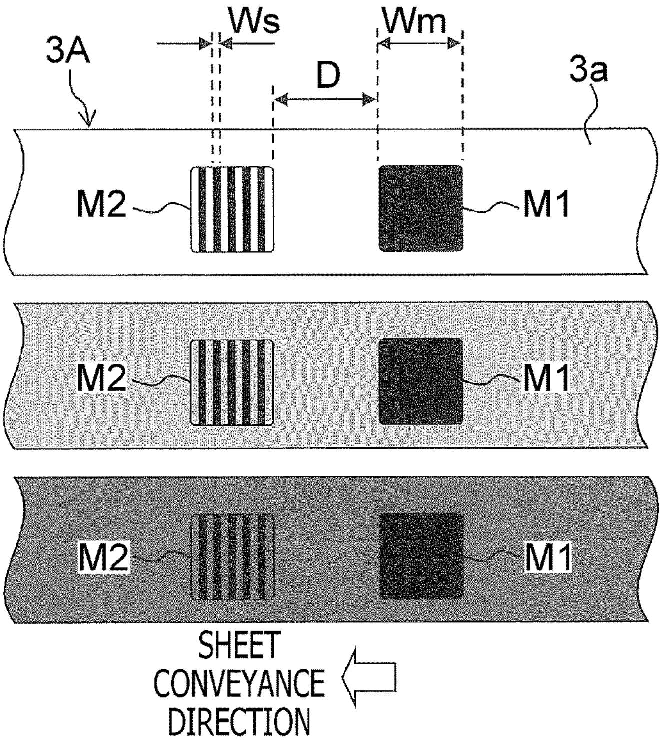
FIG. 8A
FIG. 8B
FIG. 8C
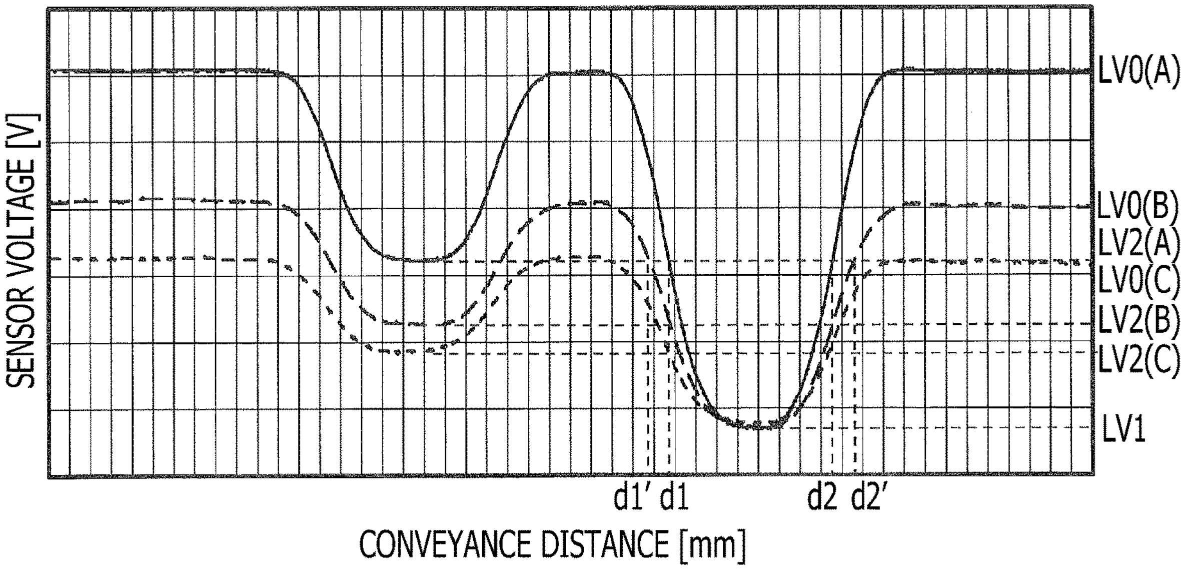
FIG. 8D

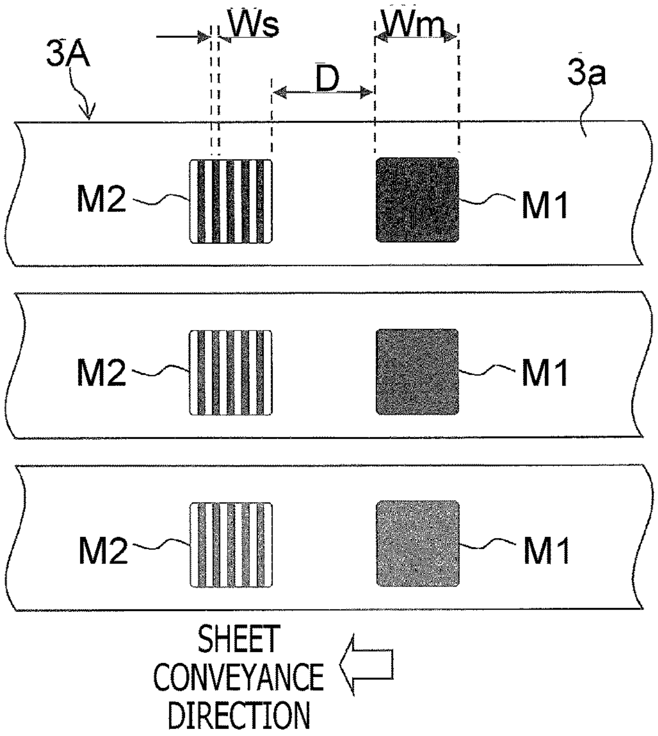
FIG. 9A
FIG. 9B
FIG. 9C
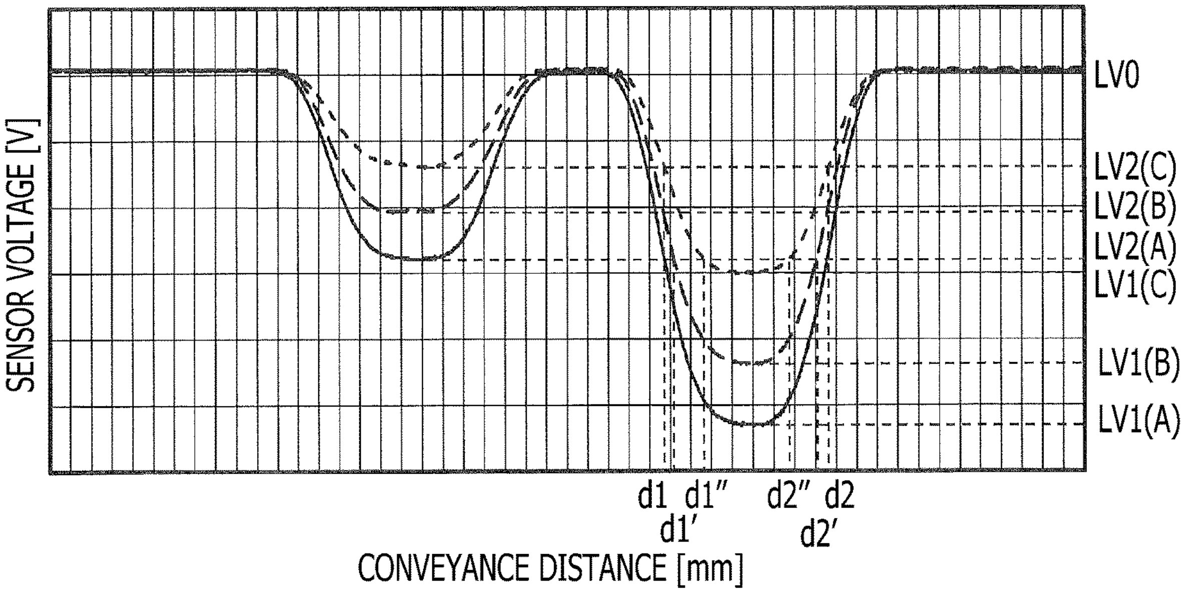
FIG. 9D

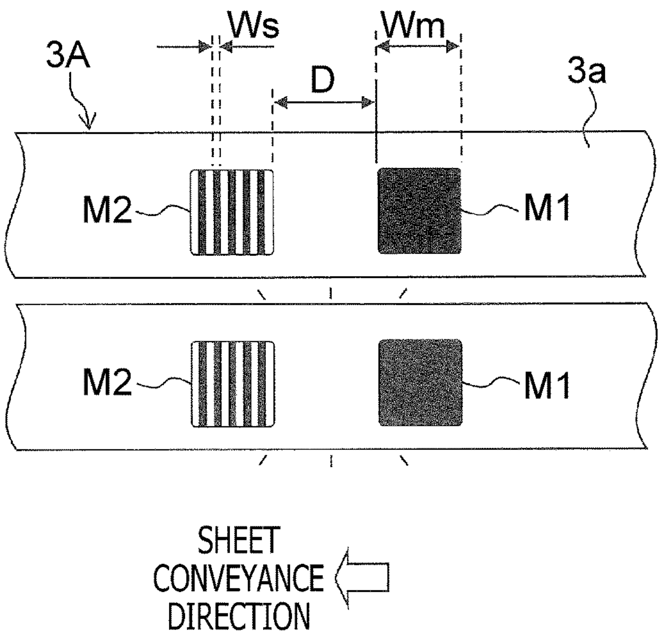
FIG. 10A
FIG. 10B
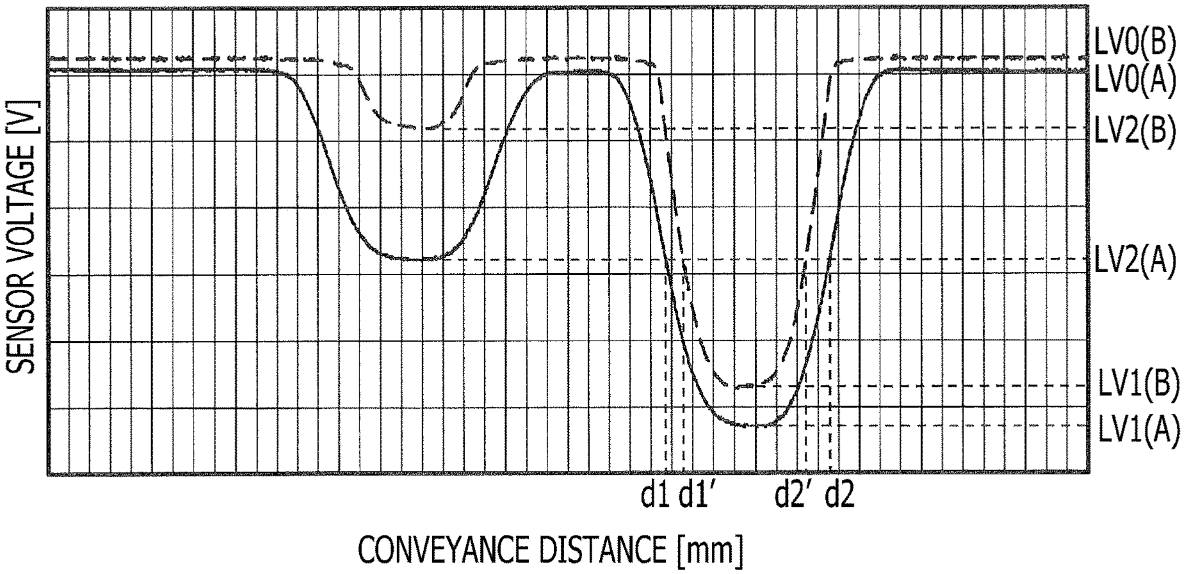
FIG. 10C

PRINTER AND TAPE FOR ACCURATELY DETECTING POSITION OF MARK ON THE TAPE

CROSS-REFERENCE TO RELATED APPLICATION

This application claims priority under 35 U.S.C. § 119 from Japanese Patent Application No. 2020-053895 filed on Mar. 25, 2020. The entire subject matter of the application is incorporated herein by reference.

BACKGROUND

Technical Field

Aspects of the present disclosure are related to a printer having a reflection sensor for detecting a mark on a tape, and to the tape having the mark thereon.

Related Art

A printer has been known that is configured to detect a mark on a tape by a reflection sensor and detect a position of the mark based on whether a level of a detection signal output from the reflection sensor has reached a threshold.

SUMMARY

The known printer might falsely detect the position of the mark due to influences of a print density of the mark and a reflectivity of the tape.

Aspects of the present disclosure are advantageous to provide one or more improved techniques for a printer that make it possible to accurately detect a position of a mark on a tape without being affected by variations in a print density of the mark and a reflectivity of the tape.

According to aspects of the present disclosure, a printer is provided, which includes a conveyor configured to convey a tape in a conveyance direction, the tape having a plurality of marks formed thereon, the plurality of marks including a first mark, and a second mark formed downstream of the first mark in the conveyance direction, a print head configured to print an image on the tape being conveyed by the conveyor, a reflection sensor configured to detect the plurality of marks on the tape by emitting light toward the tape and receiving reflected light from the tape, and output a detection signal according to the received reflected light when detecting the plurality of marks, and a controller. The controller is configured to set a threshold to be variable based on a level of the detection signal when the reflection sensor detects the second mark, and identify a position of the first mark based on a result of comparison between the set threshold and a level of the detection signal when the reflection sensor detects the first mark.

According to aspects of the present disclosure, further provided is a tape that includes a plurality of marks formed thereon. The plurality of marks include a first mark colored uniformly and entirely, and a second mark colored in a striped pattern or a dot pattern. The second mark is spaced apart from the first mark in a longitudinal direction of the tape.

According to aspects of the present disclosure, further provided is a tape that includes a plurality of marks formed thereon. The plurality of marks include a first mark colored in a first striped pattern or a first dot pattern, and a second mark colored in a second striped pattern or a second dot pattern. The second mark is spaced apart from the first mark in a longitudinal direction of the tape. A coloring ratio of the second mark is lower than a coloring ratio of the first mark. The coloring ratio of each mark is a ratio of a colored area to a whole area of each mark.

BRIEF DESCRIPTION OF THE ACCOMPANYING DRAWINGS

Figure 6:
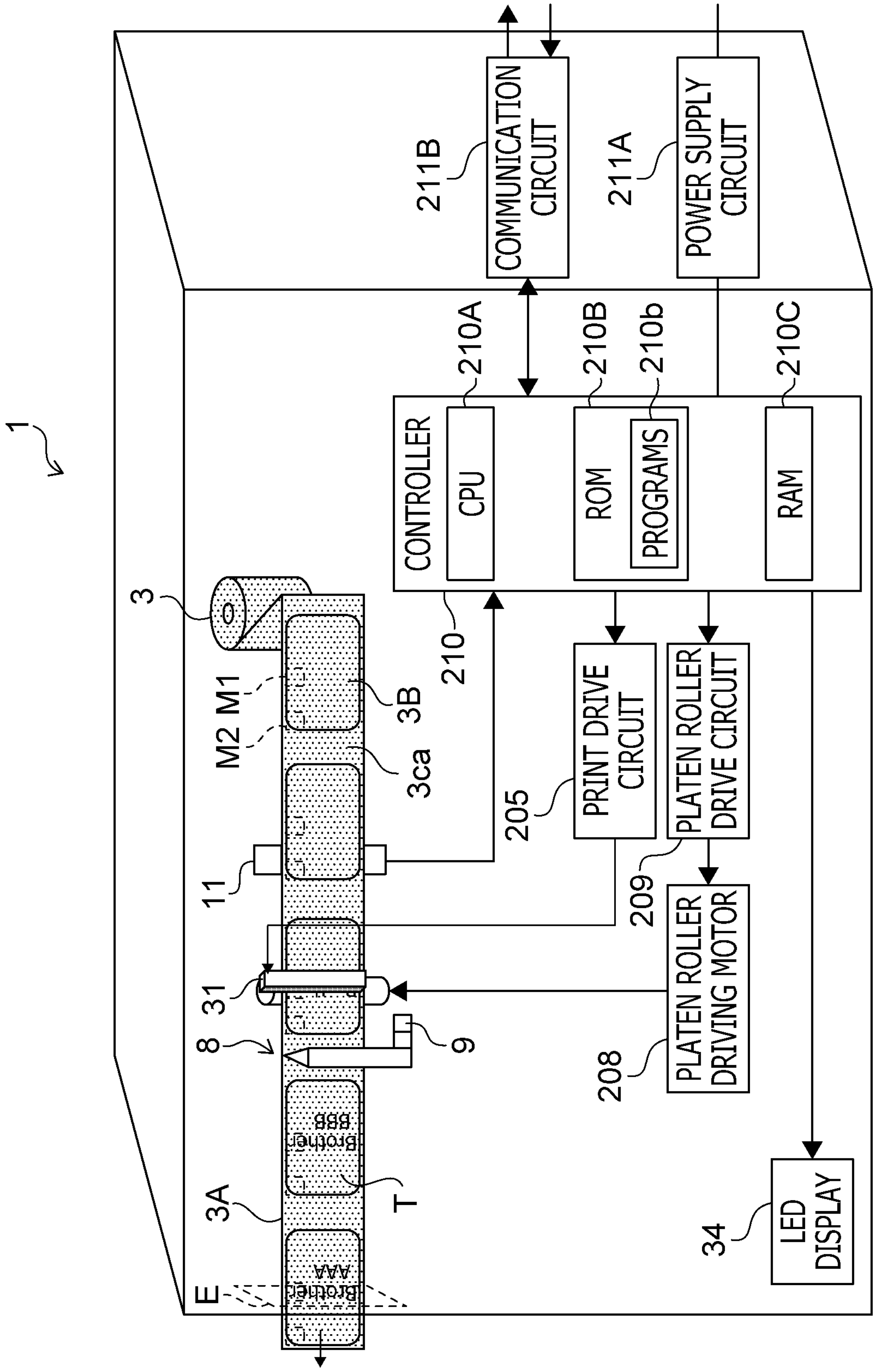

FIG. 6 schematically shows a control system of the label producing apparatus in the illustrative embodiment according to one or more aspects of the present disclosure.

Figure 7A:
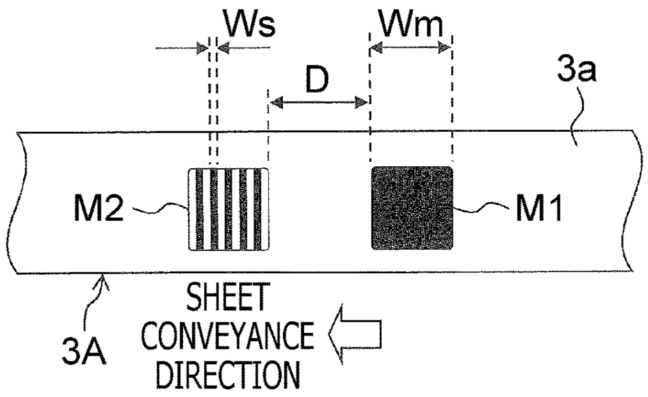

FIG. 7A is an enlarged view showing a first mark and a second mark printed on the release material layer of the label sheet, in the illustrative embodiment according to one or more aspects of the present disclosure.

Figure 7B:
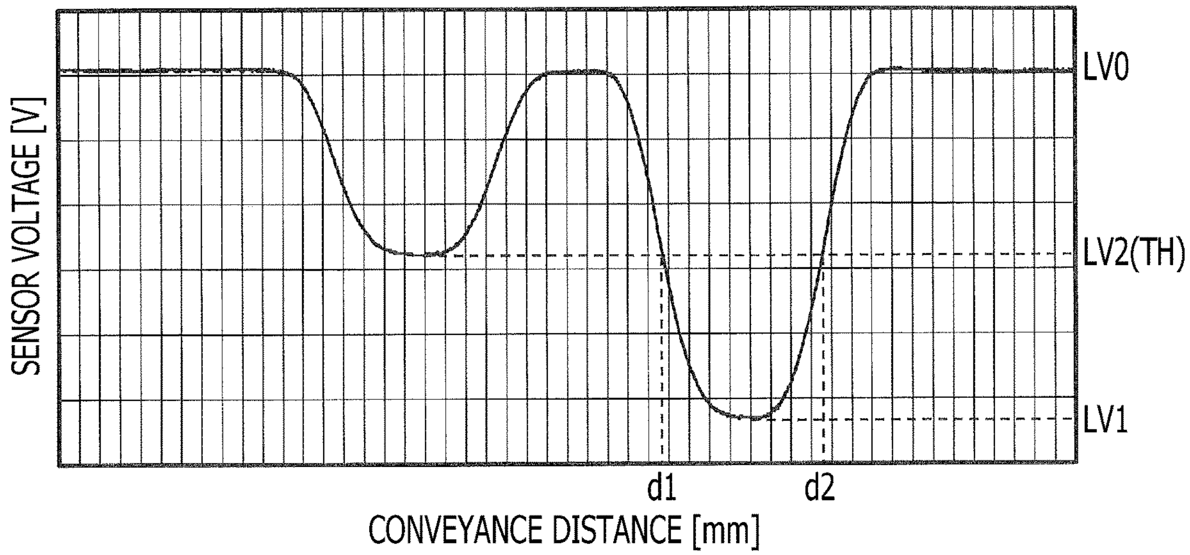

FIG. 7B is a graph showing a change in a level of a detection signal from a reflection sensor detecting the first mark and the second mark, in the illustrative embodiment according to one or more aspects of the present disclosure.

FIGS. 8A to 8C are enlarged views showing the first mark and the second mark when a white level of a base color of the release material layer decreases, in the illustrative embodiment according to one or more aspects of the present disclosure.

FIG. 8D is a graph showing changes in the level of the detection signal from the reflection sensor detecting the first mark and the second mark when the white level of the base color of the release material layer decreases, in the illustrative embodiment according to one or more aspects of the present disclosure.

FIGS. 9A to 9C are enlarged views showing the first mark and the second mark when print densities of the first mark and the second mark change, in the illustrative embodiment according to one or more aspects of the present disclosure.

FIG. 9D is a graph showing changes in the level of the detection signal from the reflection sensor detecting the first mark and the second mark when print densities of the first mark and the second mark change, in the illustrative embodiment according to one or more aspects of the present disclosure.

FIGS. 10A and 10B are enlarged views showing the first mark and the second mark when the white level of the base color of the release material layer increases, in the illustrative embodiment according to one or more aspects of the present disclosure.

FIG. 10C is a graph showing changes in the level of the detection signal from the reflection sensor detecting the first mark and the second mark when the white level of the base color of the release material layer increases, in the illustrative embodiment according to one or more aspects of the present disclosure.

Figure 11:
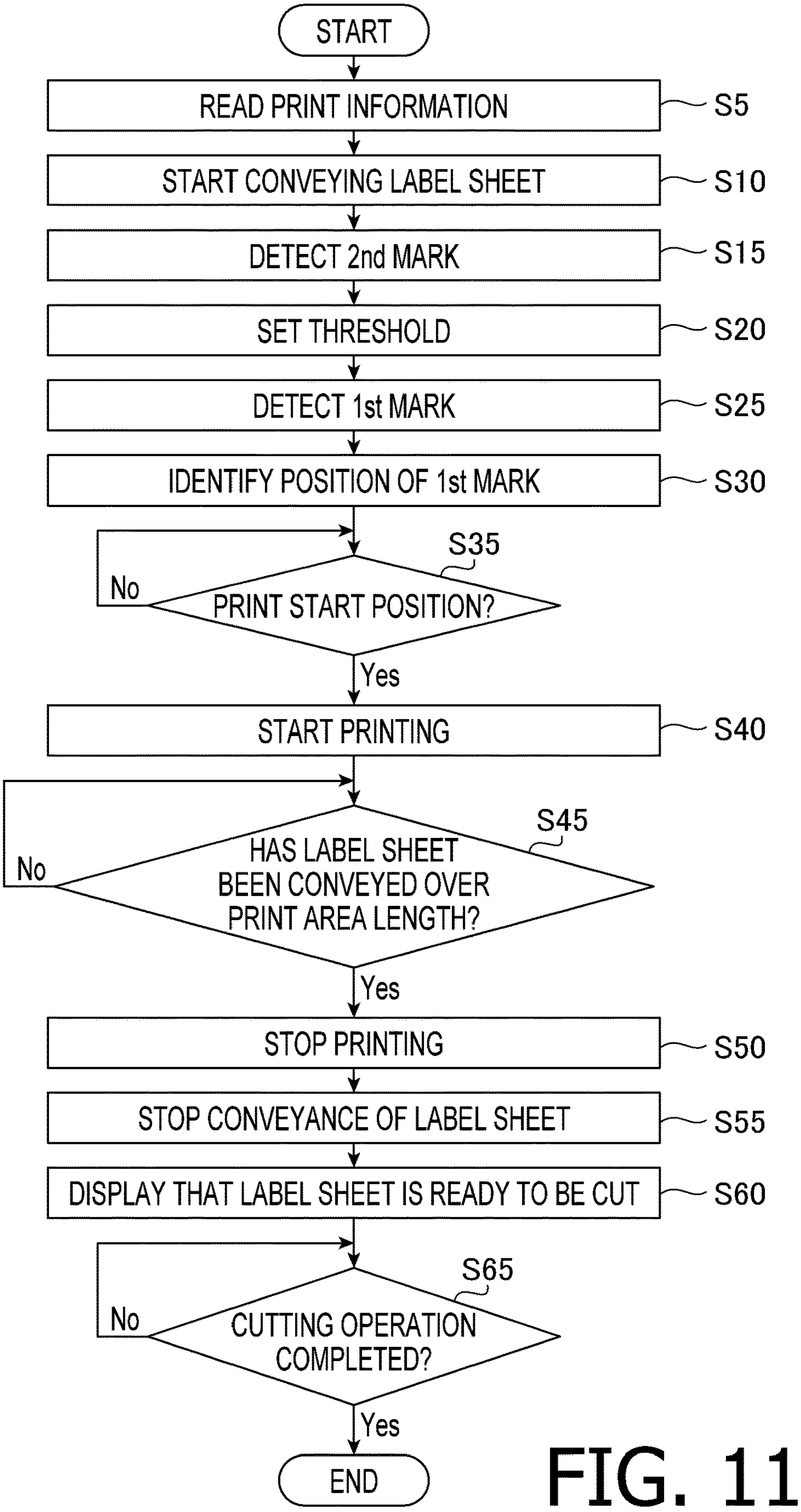

FIG. 11 is a flowchart showing a procedure of a control process by a controller of the label producing apparatus to produce a printed label, in the illustrative embodiment according to one or more aspects of the present disclosure.

Figure 12:
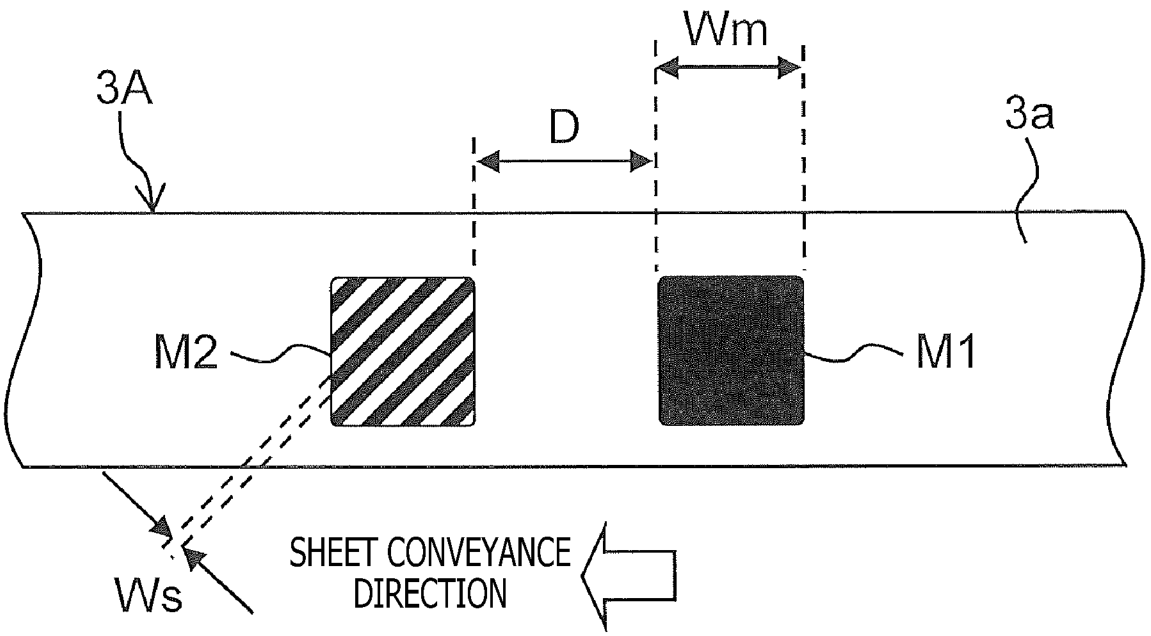

FIG. 12 is an enlarged view showing the first mark, and a second mark which has a striped pattern different from a striped pattern shown in FIG. 7A, in a modification according to one or more aspects of the present disclosure.

Figure 13:
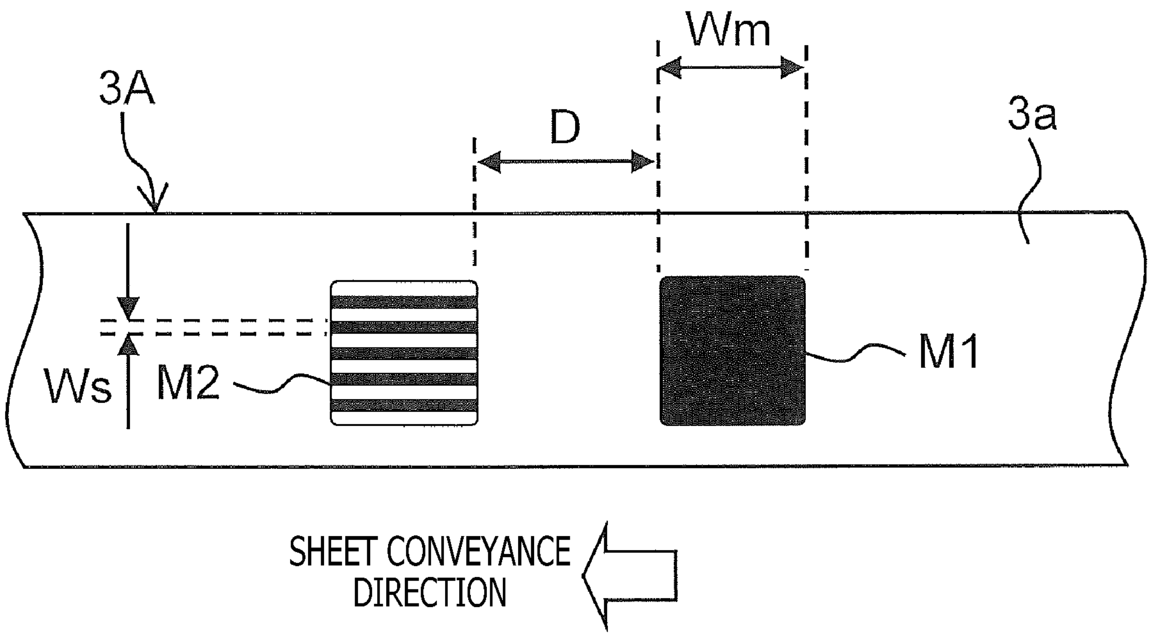

FIG. 13 is an enlarged view showing the first mark, and a second mark which has a striped pattern different from the striped patterns shown in FIGS. 7A and 12, in a modification according to one or more aspects of the present disclosure.

Figure 14:
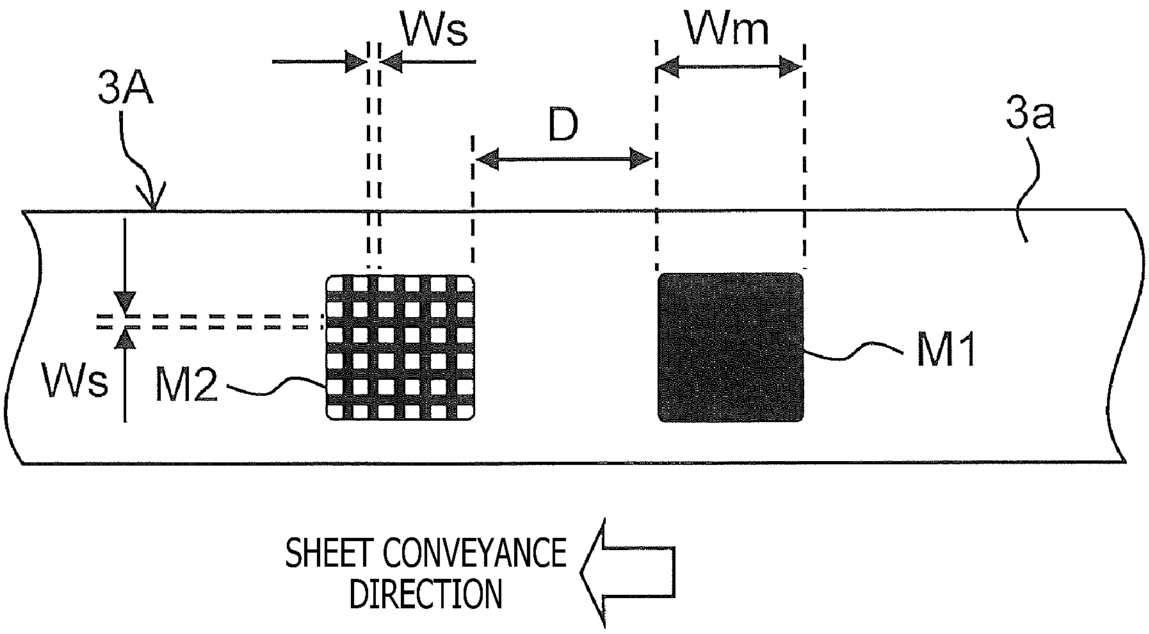

FIG. 14 is an enlarged view showing the first mark, and a second mark which has a striped pattern different from the striped patterns shown in FIGS. 7A, 12 and 13, in a modification according to one or more aspects of the present disclosure.

Figure 15:
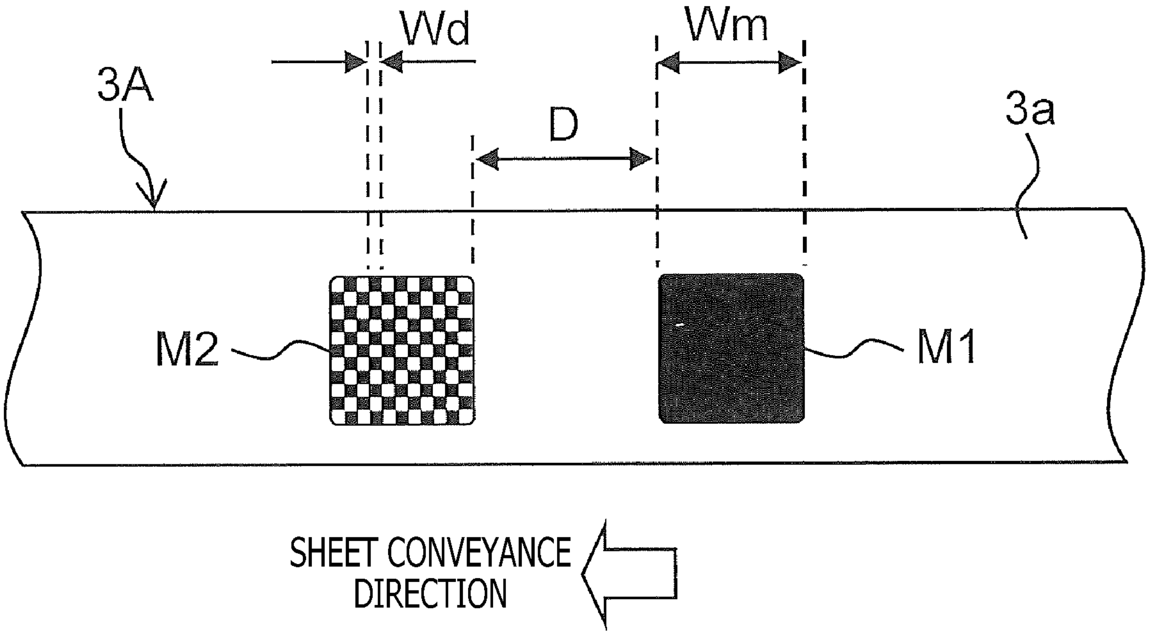

FIG. 15 is an enlarged view showing the first mark, and a second mark which has a dot pattern, in a modification according to one or more aspects of the present disclosure.

Figure 16:
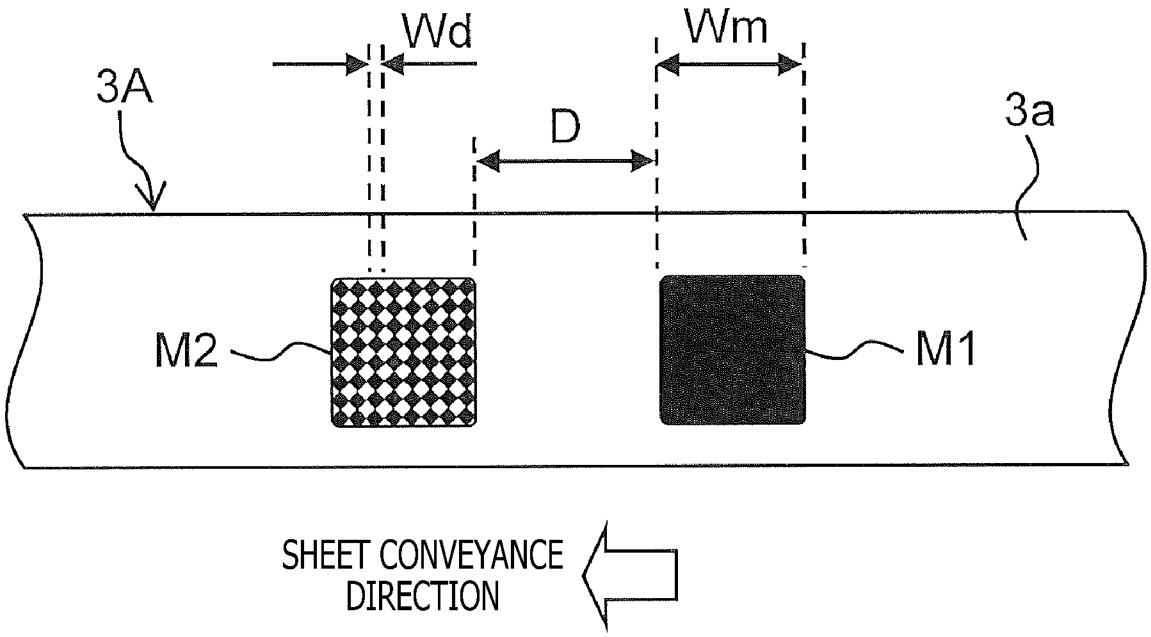

FIG. 16 is an enlarged view showing the first mark, and a second mark which has a dot pattern different from the dot pattern shown in FIG. 15, in a modification according to one or more aspects of the present disclosure.

Figure 17:
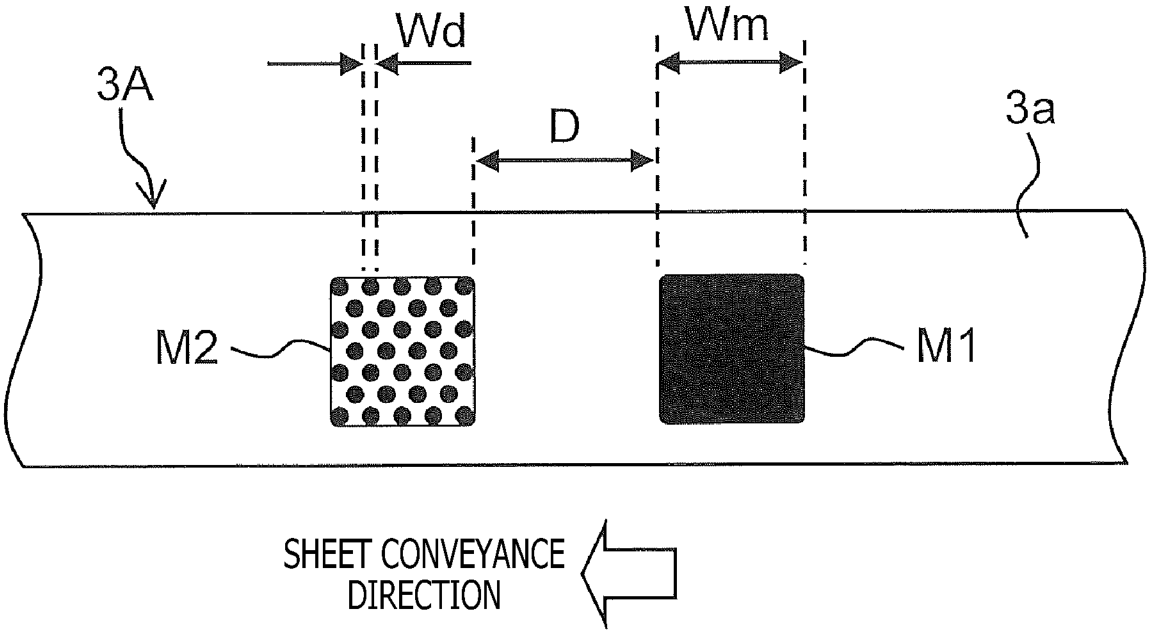

FIG. 17 is an enlarged view showing the first mark, and a second mark which has a dot pattern different from the dot patterns shown in FIGS. 15 and 16, in a modification according to one or more aspects of the present disclosure.

Figure 18:
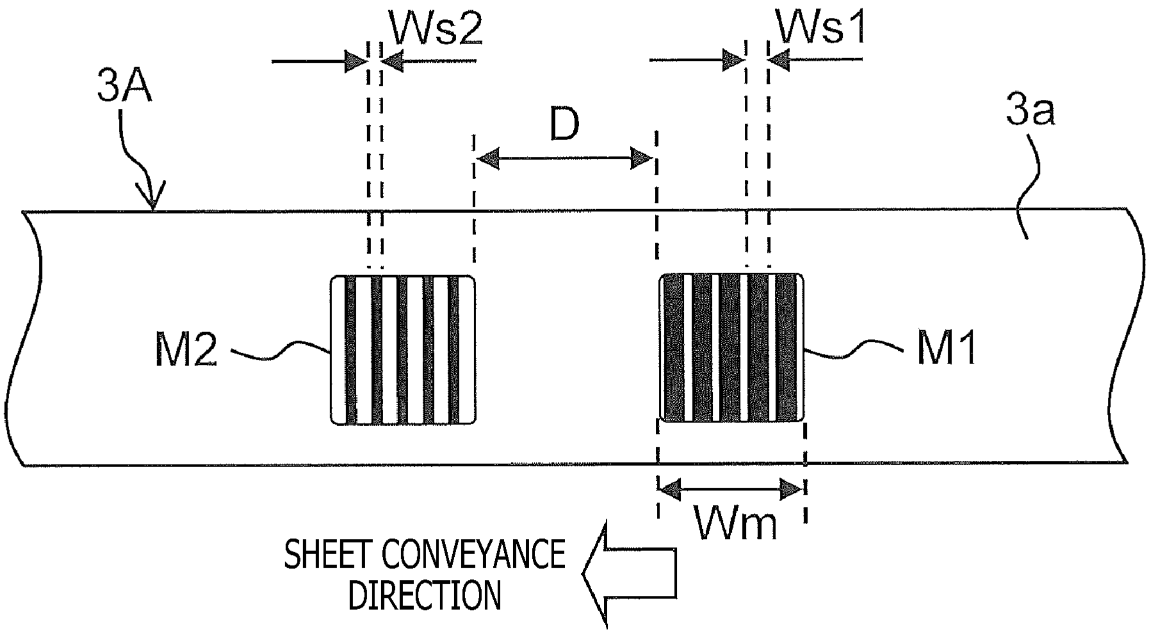

FIG. 18 is an enlarged view showing a first mark and a second mark that have respective different striped patterns, in a modification according to one or more aspects of the present disclosure.

Figure 19:
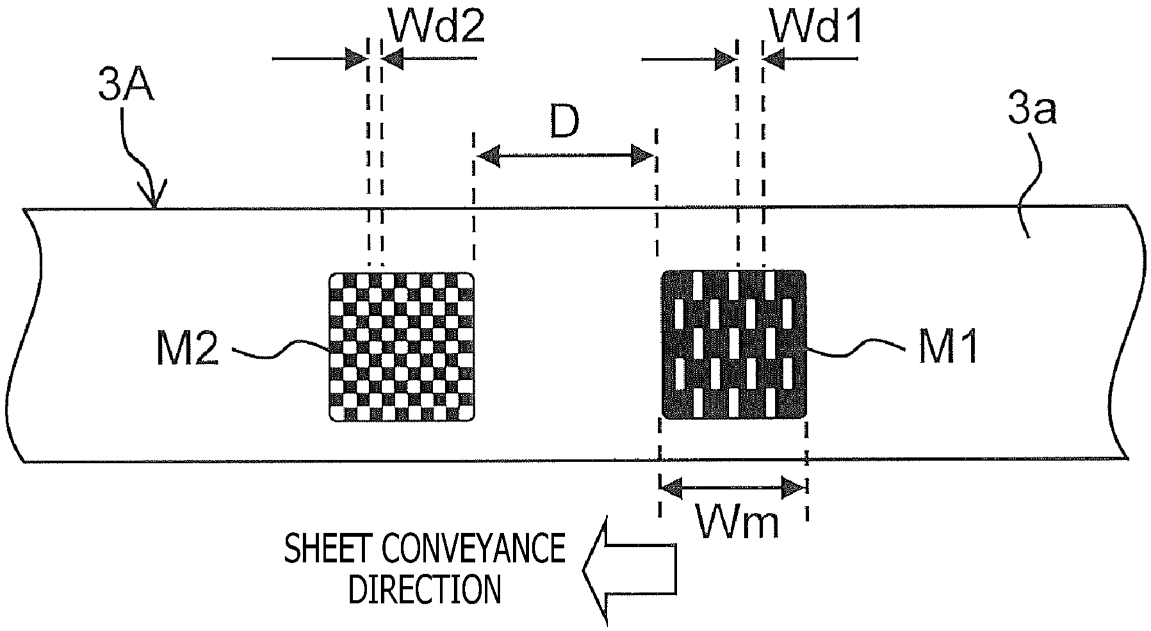

FIG. 19 is an enlarged view showing a first mark and a second mark that have respective different dot patterns, in a modification according to one or more aspects of the present disclosure.

Figure 20:
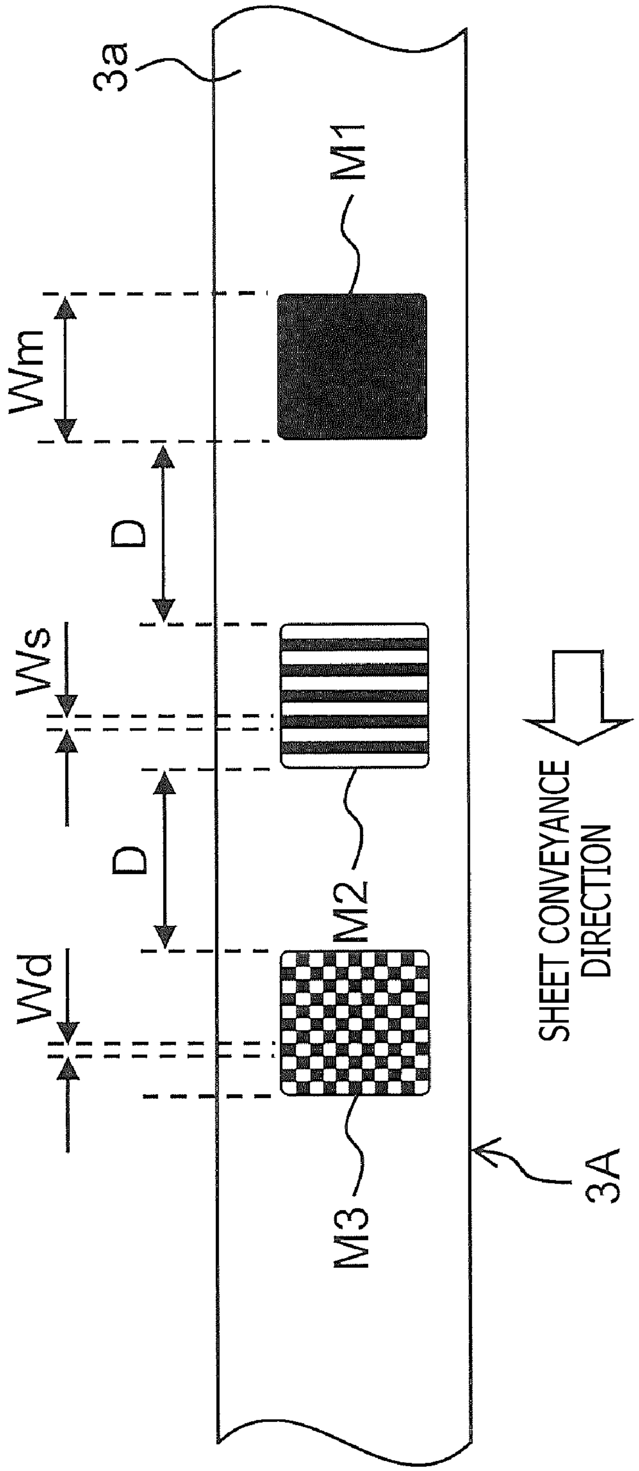

FIG. 20 is an enlarged view showing three types of marks, i.e., a first mark, a second mark and a third mark that have respective different patterns, in a modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs. CD-media, DVD-media, temporary storage, hard disk drives, floppy drives, permanent storage, and the like.

Hereinafter, an illustrative embodiment according to aspects of the present disclosure will be described with reference to the accompanying drawings. In the illustrative embodiment, aspects of the present disclosure are applied to a label producing apparatus as a printer.

Figure 1:
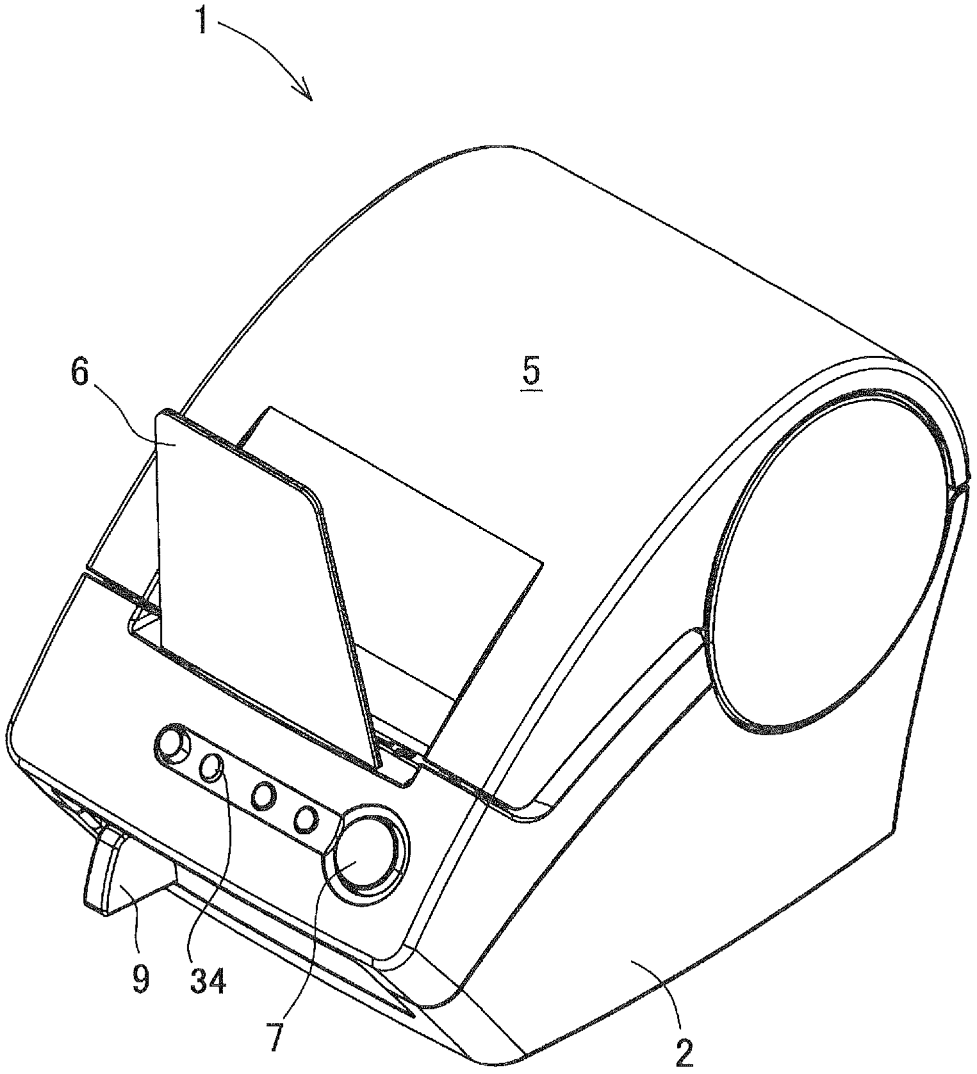
FIG. 1 is a perspective view schematically showing a configuration of a label producing apparatus in an illustrative embodiment according to one or more aspects of the present disclosure.

As shown in FIG. 1, a label producing apparatus 1 includes a main body housing 2, an upper cover 5, a tray 6, a power button 7, a cutter lever 9, and an LED display 34. The tray 6 is erected to face a front middle portion of the upper cover 5. The power button 7 is disposed in front of the tray 6. It is noted that a lower left side of FIG. 1 is defined as a front side of the label producing apparatus 1, and an upper right side of FIG. 1 is defined as a rear side of the label producing apparatus 1.

Figure 2:
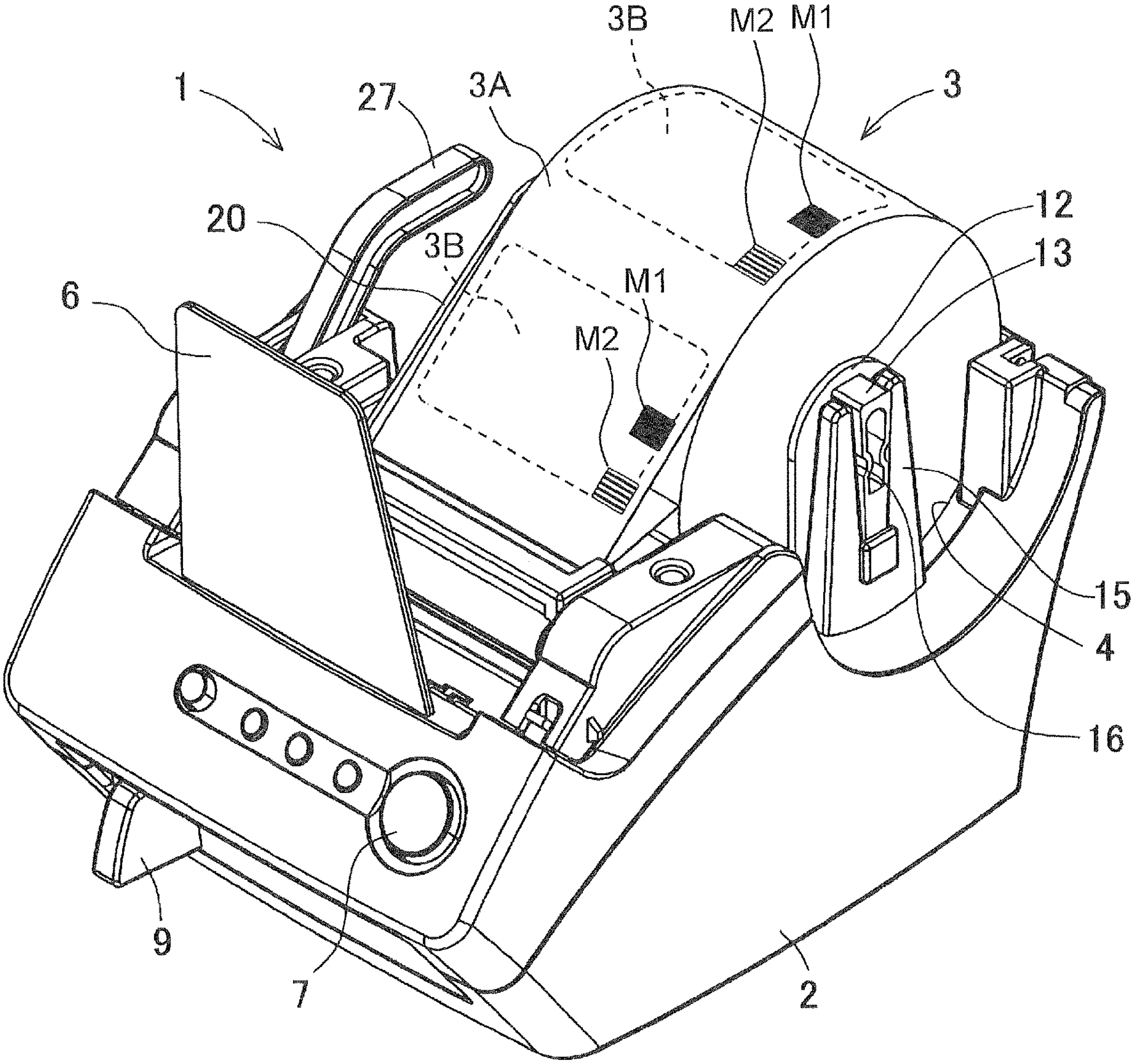
FIG. 2 is a perspective view of the label producing apparatus from which an upper cover is removed, in the illustrative embodiment according to one or more aspects of the present disclosure.

FIG. 2 shows the label producing apparatus 1 from which the top cover 5 is removed. As shown in FIG. 2, a holder 3 is stored in a holder storage 4. The holder 3 includes a positioning holding member 12 and a guide member 20. A label sheet 3A with a particular width is rotatably wound in a roll, as a "tape" held by the holder 3. On a front side (i.e., an inner circumferential side of the roll) of the label sheet 3A, a plurality of labels 3B, on which printing is performed, are arranged at intervals of a particular pitch p along a longitudinal direction of the label sheet 3A. It is noted, hereinafter, the longitudinal direction of the label sheet 3A may be referred to as the "sheet longitudinal direction." In the illustrative embodiment, each of the labels 3B is formed in a substantially rectangular shape with rounded corners. However, each of the labels 3B may be formed in another shape. On a back side (i.e., an outer circumferential side of the roll) of the label sheet 3A, a first mark M1 and a second mark M2 are printed in respective positions corresponding to each label 3B. On both sides of the label sheet 3A in an axial direction of the roll, the aforementioned guide member 20 and the aforementioned positioning holding member 12 are disposed, respectively. The aforementioned top cover 5 is attached to a rear-side upper end portion in an openable and closable manner, so as to cover an upper side of the holder storage.

A holder support member 15 is disposed at one side end section of the holder storage 4 in a direction substantially perpendicular to a conveyance direction (hereinafter, which may be referred to as a "sheet conveyance direction") in which the label sheet 3A is conveyed. The holder support member 15 has a first positioning groove 16 that is open upward. An attachment member 13, protruding outward of the positioning holding member 12, is in close contact with the first positioning groove 16, thereby being fitted into the holder support member 15. A lever 27 is disposed at a front end portion, in the sheet conveyance direction, of the other side end section of the holder storage 4.

Figure 3:
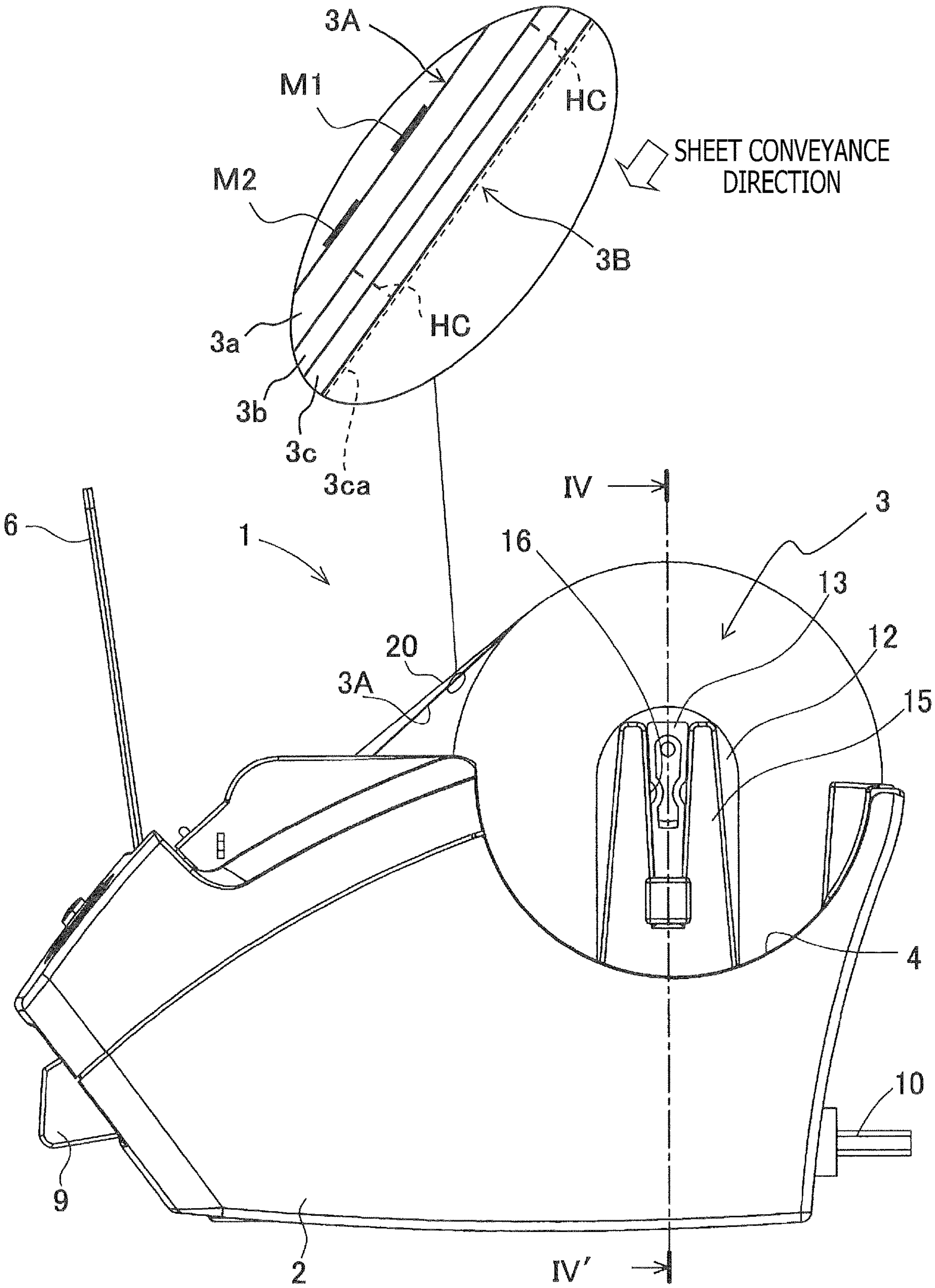
FIG. 3 is a side view of the label producing apparatus from which the upper cover is removed, in the illustrative embodiment according to one or more aspects of the present disclosure.

As shown in FIG. 3, the label sheet 3A has a four-layered structure in the illustrative embodiment. Specifically, the label sheet 3A has a release material layer 3*a*, an adhesive material layer 3*b*, a base material layer 3*c*, and a heat-sensitive layer 3*ca*, which are stacked in this order from the outer circumferential side to the inner circumferential side of the roll. The heat-sensitive layer 3*ca* has a self-coloring property to cause the heat-sensitive layer 3*ca* itself to color with heat. A substantially rectangular half-cut line HC, for forming a corresponding label 3B, is formed from a surface of the heat-sensitive layer 3*ca* side to the adhesive material layer 3*b*, of the label sheet 3A. Each label 3B, after printing, is peeled off from the release material layer 3*a* and attached to a particular product by the adhesive material layer 3*b* as a printed label T.

On an opposite side (i.e., an upper left side in FIG. 3) of the release material layer 3*a*, the first mark M1 and the second mark M2 are printed in the respective positions corresponding to each label 3B. The first mark M1 and the second mark M2 are detected by a reflection sensor 11 (see FIG. 6). Using results of the detection by the reflection sensor 11, printing positions are determined relative to the label 3B. The second mark M2 is disposed downstream of the first mark M1 in the sheet conveyance direction in which the label sheet 3A is conveyed. In the illustrative embodiment, for instance, the first mark M1 is printed substantially in a middle position of each label 3B in the sheet conveyance direction. Further, the second mark M2 is printed substantially in a downstream end position of each label 3B in the sheet conveyance direction. However, the second mark M2 may be printed in a position other than the above position, as long as the second mark M2 is located downstream of the first mark M1 in the sheet conveyance direction.

Figure 4:
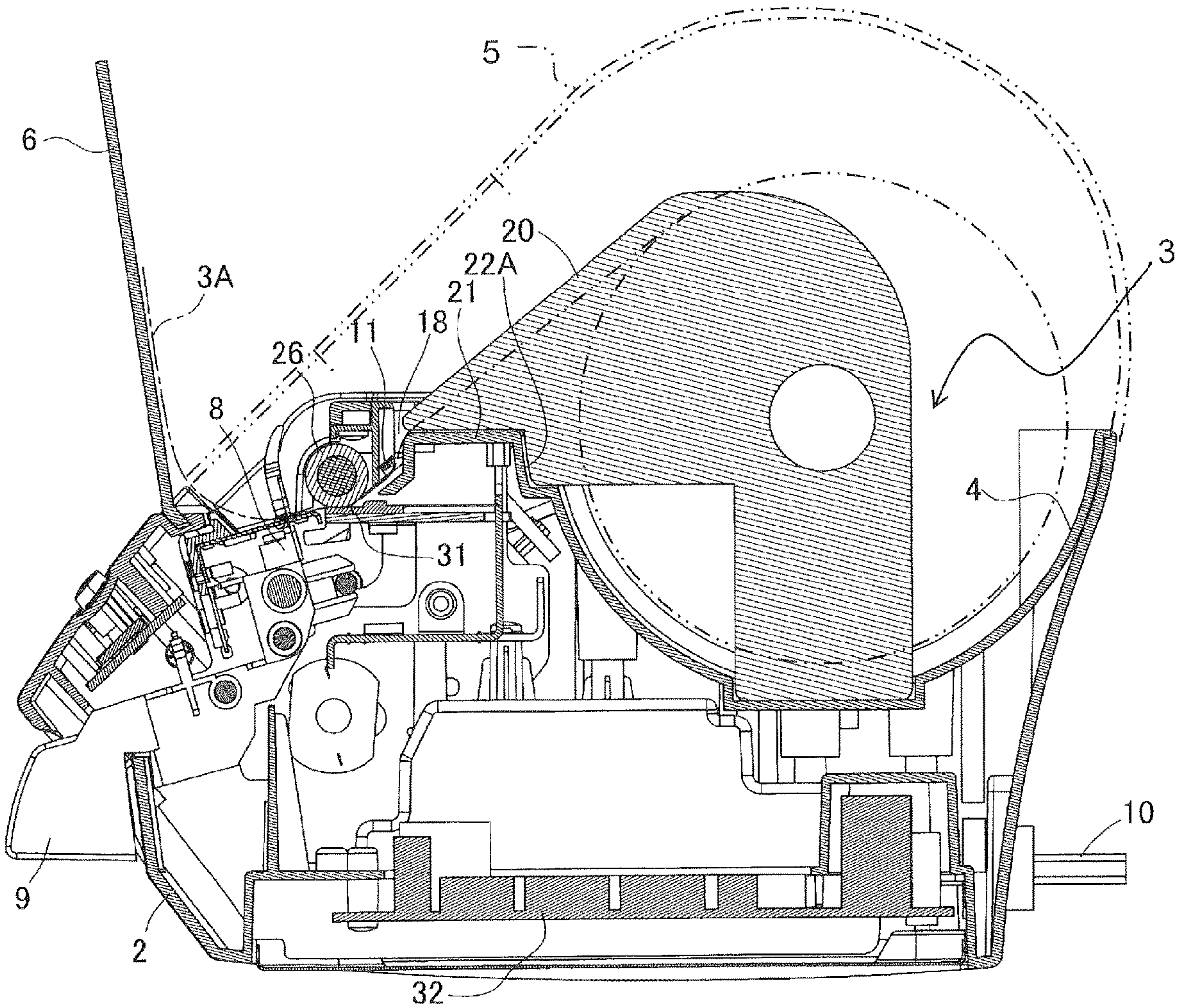
FIG. 4 is a cross-sectional side view of the label producing apparatus in a state where the upper cover is removed therefrom and a holder is attached thereto, in the illustrative embodiment according to one or more aspects of the present disclosure.

As shown in FIG. 4, when the lever 27 is rotated downward, the label sheet 3A inserted from an insertion port 18 is pressed toward a platen roller 26 by a thermal head 31. The platen roller 26 may be included in a "conveyor" according to aspects of the present disclosure. The thermal head 31 may be an example of a "print head" according to aspects of the present disclosure. When the thermal head 31 performs printing while the platen roller 26 is driven to rotate, intended printed images are sequentially formed on the printing surface of the heat-sensitive layer 3*ca* of each label 3B while the label sheet 3A is being conveyed. The label sheet 3A discharged on the tray 6 is cut by a cutter unit 8 when the cutter lever 9 is operated to move.

The reflection sensor 11 is disposed between the insertion port 18 and the platen roller 26 in the sheet conveyance direction. The reflection sensor 11 is a reflection-type optical sensor including a light emitting element (not shown) and a light receiving element (not shown). The reflection sensor 11 is configured to detect the first mark M1 and the second mark M2 formed on the release material layer 3*a* of the label sheet 3A based on light received by the light receiving element, and output a corresponding detection signal.

The aforementioned guide member 20 is stored in the holder storage 4, with a front portion thereof in contact with a placement section 21 and a positioning groove 22A. Below the holder storage 4, a control board 32 is disposed on which a controller 210 is formed. The controller 210 is configured to drive and control each mechanism included in the label producing apparatus 1 according to instructions from an external device such as a personal computer. A power cord 10 is connected with one side end portion of a rear section of the main body housing 2.

Figure 5C:
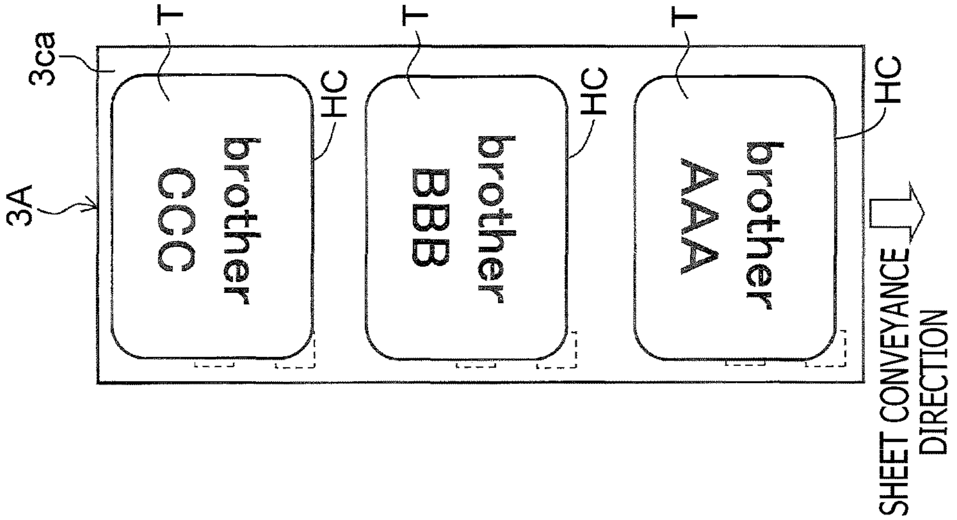
FIG. 5C is a plan view showing the surface of the heat-sensitive layer side of the label sheet after printing thereon, in the illustrative embodiment according to one or more aspects of the present disclosure.
Figure 5B:
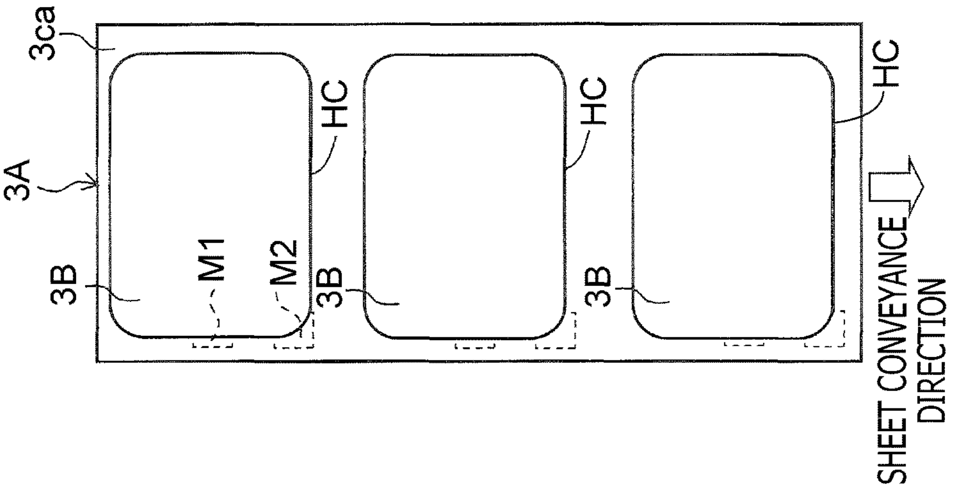
FIG. 5B is a plan view showing a surface of a heat-sensitive layer side of the label sheet before printing thereon, in the illustrative embodiment according to one or more aspects of the present disclosure.
Figure 5A:
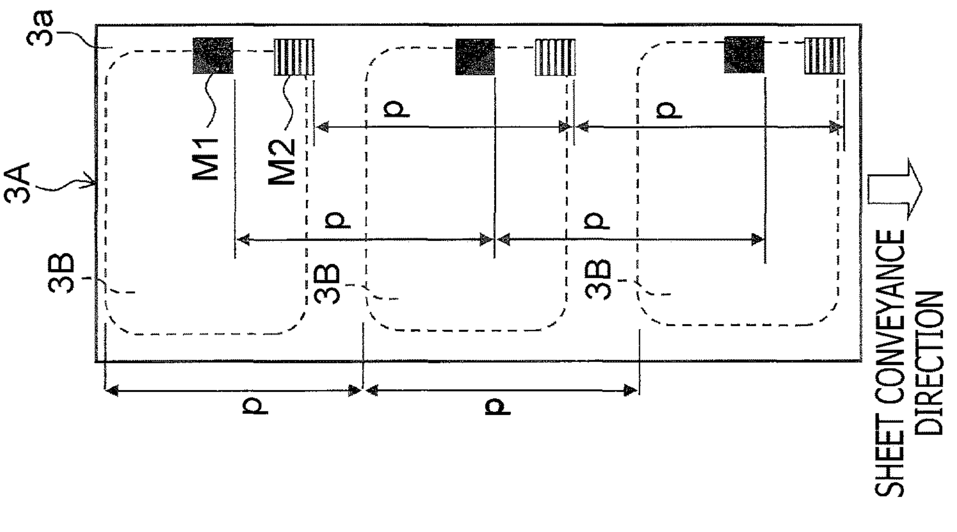
FIG. 5A is a plan view showing a surface of a release material layer side of a label sheet with first marks and second marks printed thereon, in the illustrative embodiment according to one or more aspects of the present disclosure.

As shown in FIG. 5A, the first mark M1 and the second mark M2 are printed in respective positions corresponding to each label 3B, on the surface of the release material layer 3*a* side of the label sheet 3A, as described above. Each of the first and second marks M1 and M2 is printed at intervals of substantially the same pitch as the pitch p for the labels 3B. The second mark M2 is disposed downstream of the first mark M1 in the sheet conveyance direction in which the label sheet 3A is conveyed. As described above, for instance, the first mark M1 is printed substantially in the middle position of each label 3B in the sheet conveyance direction. The second mark M2 is printed substantially in the downstream end position of each label 3B in the sheet conveyance direction.

As shown in FIGS. 5B and 5C, on the surface of the heat-sensitive layer 3*ca* side of the label sheet 3A, the substantially rectangular half-cut line HC is formed by cutting the other portion than the release material layer 3*a* of the label sheet 3A, as described above. The half-cut line HC is for peeling a printed label T, which is a label 3B with an intended image (e.g., characters) printed thereon, off from the release material layer 3*a*. In a print area of the label 3B surrounded by the half-cut line HC, the intended image based on print data is printed from the downstream side of the label sheet 3A in the sheet conveyance direction. After completion of the printing, only the printed label T is peeled off from the release material layer 3A along the half-cut line HC. Then, the printed label T is attached to a product by the adhesive material layer 3*b*. In the example shown in FIG. 5C, a printed label T with characters "brother AAA" printed thereon, a printed label T with characters "brother BBB" printed thereon, and a printed label T with characters "brother CCC" printed thereon are conveyed side by side in this order in the sheet conveyance direction.

In FIG. 6, on each label 3B of the label sheet 3A fed out of the holder 3, printing is performed by the thermal head 31, and the printed labels T are produced. The label sheet 3A, on which the printed labels T are arranged, is cut by the cutter unit 8 when the cutter lever 9 is operated, as described above.

The label producing apparatus 1 includes the aforementioned platen roller 26, a platen roller driving motor 208, a platen roller drive circuit 209, and a print drive circuit 205. The platen roller 26 is configured to convey the label sheet 3A toward a discharge port E. The platen roller driving motor 208 is configured to drive the platen roller 26. The platen roller drive circuit 209 is configured to control the platen roller driving motor 208. The print drive circuit 205 is configured to perform energization control for the thermal head 31. Further, the label producing apparatus 1 includes the aforementioned controller 210 and the aforementioned LED display 34. The controller 210 is configured to control overall operations of the label producing apparatus 1 via the print drive circuit 205 and the platen roller drive circuit 209. The LED display 34 is configured to be turned on by a control signal from the controller 210. The disposition, as shown in FIG. 6, of the reflection sensor 11, the platen roller 26, the thermal head 31, and the cutter unit 8 is conceptual, and does not indicate actual locations of these elements.

The controller 210 is a so-called microcomputer, which includes a CPU 210A, a ROM 210B, and a RAM 210C. The controller 210 performs signal processing according to programs 210*b* stored in the ROM 210B, using a temporary storage function of the RAM 210C. The controller 210 is supplied with electricity from a power supply circuit 211A. The controller 210 is connected, for instance, with a communication network via a communication circuit 211B. The control unit 210 is further configured to perform data communication to exchange information with a root server (not shown), other terminals (not shown), a general-purpose computer (not shown), and an information server (not shown) via the communication network.

The controller 210 receives detection signals from the reflection sensor 11 and performs a position identification process and a threshold setting process based on the detection signals. The position identification process is a process to identify the position of the first mark M1 based on a result of comparison between a level of the detection signal when the reflection sensor 11 detects the first mark M1 and a threshold set in the threshold setting process. The threshold setting process is a process to set a threshold to be variable based on a level of the detection signal when the reflection sensor 11 detects the second mark M2. The specific details of these processes will be described below with reference to FIGS. 7 to 10.

FIG. 7 shows an enlarged view of the first mark M1 and the second mark M2 printed on the release material layer 3*a* of the label sheet 3A, and also shows changes in the level (i.e., a sensor voltage [V]) of the detection signal from the reflection sensor 11 when the first mark M1 and the second mark M2 are detected.

As shown in FIG. 7, the first mark M1 is a substantially rectangular mark uniformly and entirely colored black. The second mark M2 is a substantially rectangular mark with a black striped pattern. The first mark M1 and the second mark M2 are formed to have the same shape and the same area. However, the first mark M1 and the second mark M2 may be formed to have respective different shapes and respective different areas. Further, each of the first mark M1 and the second mark M2 may be formed in a shape other than the rectangular shape. Moreover, each of the first mark M1 and the second mark M2 may be formed with a color (e.g., dark blue) other than black as long as the color is low in reflectivity.

A length Wm of the first mark M1 in the sheet longitudinal direction (i.e., a left-right direction in FIG. 7) is set to be equal to or more than a spot diameter of the reflection sensor 11. Likewise, a length of the second mark M2 in the sheet longitudinal direction is also set to be equal to or more than the spot diameter of the reflection sensor 11. Further, a distance D between the first mark M1 and the second mark M2 in the sheet longitudinal direction is set to be equal to or more than the length Wm of the first mark M1 in the sheet longitudinal direction.

The second mark M2 has a striped pattern. In general, the "striped pattern" is a pattern formed with a plurality of lines colored with two or more different colors or different densities of the same color being arranged parallel to or crossing each other. Examples of the "striped pattern" may include, but are not limited to, a pattern of vertical stripes, a pattern of horizontal stripes, and a pattern of crossing stripes (e.g., a checkered pattern). In the illustrative embodiment, the striped pattern of the second mark M2 is formed with a plurality of black straight lines substantially perpendicular to the sheet conveyance direction being arranged parallel to each other at intervals of a particular pitch. Further, the striped pattern of the second mark M2 is formed with the black color of the said plurality of lines and the white color that is a base color of the release material layer 3*a*. Thereby, a coloring ratio (i.e., a black-white ratio) of the second mark M2 is lower than the coloring ratio of the first mark M1. It is noted that the coloring ratio is a ratio of an area of portion(s) colored black to the whole area. As a result, an amount of light received by the light receiving element when the second mark M2 is detected by the reflection sensor 11 is larger than an amount of light received by the light receiving element when the first mark M1 is detected by the reflection sensor 11. In the illustrative embodiment, a line width Ws and the pitch of the striped pattern are set in such a manner that the coloring ratio of the second mark M2 is approximately 50%, while the coloring ratio of the first mark M1 is 100%.

The coloring ratio of the second mark M2 is not limited to 50% but may be any other ratio. However, as will be described below, a threshold for detecting the first mark M1 is set based on the detection signal level when the reflection sensor 11 detects the second mark M2. Therefore, the coloring ratio of the second mark M2 is preferred to be a value (e.g., 40% to 60%) around half of the coloring ratio of the first mark M1, in such a manner that the threshold is set to a value around half of the detection signal level for the first mark M1 so as to more securely prevent false detection of the first mark M1.

The line width Ws of the striped pattern of the second mark M2 is not limited to a particular value, as long as the coloring ratio of the second mark M2 is settable to about 50%. However, the line width Ws is preferred to be equal to or less than half of the length Wm of the first mark M1 in the sheet longitudinal direction, in such a manner that the reflection sensor 11, when detecting the second mark M2, outputs a detection signal with a gentle waveform.

As shown in FIG. 7B, the level of the detection signal from the reflection sensor 11 changes when the reflection sensor 11 detects the first mark M1 and the second mark M2. In FIG. 7B, a level LV0 is a detection signal level when the reflection sensor 11 detects the base color (i.e., white) of the release material layer 3*a*. A level LV1 is a minimum level of the detection signal when the reflection sensor 11 detects the first mark M1. A level LV2 is a minimum level of the detection signal when the reflection sensor 11 detects the second mark M2. As described above, the coloring ratio of the second mark M2 is approximately 50% while the coloring ratio of the first mark M1 is 100%. Therefore, an amount of change in the level LV2 relative to the level LV0 is approximately 50% of an amount of change in the level LV1 relative to the level LV0.

In the aforementioned threshold setting process, the controller 210 sets, to the level LV2, a threshold TH of the detection signal level to be used for detecting the first mark M1. Further, in the aforementioned position identification process, the controller 210 identifies the position of the first mark M1 based on a result of comparison between the detection signal level when the reflection sensor 11 detects the first mark M1 and the set threshold TH (i.e., the level LV2). In the example shown in FIG. 7, the first mark M1 is identified as being formed between respective corresponding positions of a conveyance distance d1 and a conveyance distance d2 of the label sheet 3A. The conveyance distance of the label sheet 3A is detected by an encoder (not shown) provided to the platen roller driving motor 208.

Subsequently, an explanation will be provided of a case in which a white level (i.e., reflectivity) of the base color of the release material layer 3*a* of the label sheet 3A decreases. The white level of the release material layer 3*a* may decrease due to, for instance, a change in material, a manufacturing process, or a manufacturer of the release material layer 3*a*, or a decrease in the reflectivity of the release material layer 3*a* due to the release material layer 3*a* being thinner. FIGS. 8A to 8C show enlarged views of the first mark M1 and the second mark M2 in a situation where print densities of the first mark M1 and the second mark M2 do not change, and the white level of the release material layer 3*a* decreases. Further, FIG. 8D shows changes in the level of the detection signal from the reflection sensor 11 detecting the first mark M1 and the second mark M2 in the same situation as above. More specifically, FIG. 8A shows a normal state in which the white level of the release material layer 3*a* is not reduced. FIG. 8B shows a state in which the white level of the release material layer 3*a* has become lower than in the state shown in FIG. 8A. FIG. 8C shows a state in which the white level of the release material layer 3*a* has become even lower than in the state shown in FIG. 8B.

In FIG. 8D, a level LV0(A) is a detection signal level when the reflection sensor 11 detects the base color in the state (see FIG. 8A) in which the white level of the release material layer 3*a* is not reduced. A level LV0(B) is a detection signal level when the reflection sensor 11 detects the base color in the state (see FIG. 8B) in which the white level of the release material layer 3*a* has become lower. A level LV0(C) is a detection signal level when the reflection sensor 11 detects the base color in the state (see FIG. 8C) in which the white level of the release material layer 3*a* has become even lower. Likewise, a level LV2(A) is a minimum level of the detection signal when the reflection sensor 11 detects the second mark M2 in the state (see FIG. 8A) in which the white level of the release material layer 3*a* is not reduced. A level LV2(B) is a minimum level of the detection signal when the reflection sensor 11 detects the second mark M2 in the state (see FIG. 8B) in which the white level of the release material layer 3*a* has become lower. A level LV2(C) is a minimum level of the detection signal when the reflection sensor 11 detects the second mark M2 in the state (see FIG. 8C) in which the white level of the release material layer 3*a* has become even lower.

As shown in FIG. 8D, when the white level of the release material layer 3*a* decreases, the detection signal level when the reflection sensor 11 detects the base color of the release material layer 3*a* decreases. Thus, if the threshold TH (which is equal to the level LV2(A)) set in the state shown in FIG. 8A is used as is when the white level of the release material layer 3*a* has decreased, false detection will occur. For instance, in the state shown in FIG. 8A, the first mark M1 is detected as being located between the respective corresponding positions of the conveyance distances d1 and d2 of the label sheet 3A. Meanwhile, in the state shown in FIG. 8B, the detection signal level when the reflection sensor 11 detects the base color of the release material layer 3*a* becomes lower. Therefore, the first mark M1 is detected as being located between respective corresponding positions of conveyance distances d1' and d2', to be displaced from an actual position of the first mark M1. Furthermore, in the state shown in FIG. 8C, the detection signal level when the reflection sensor 11 detects the base color of the release material layer 3*a* is substantially equal to or less than the threshold TH (which is equal to the level LV2(A)). In this case, it might be impossible to identify the position of the first mark M1.

In the illustrative embodiment, the controller 210 sets the threshold TH to the level LV2(A) in the state shown in FIG. 8A. The controller 210 sets the threshold TH to the level LV2(B) in the state shown in FIG. 8B. The controller 210 sets the threshold TH to the level LV2(C) in the state shown in FIG. 8C. As described above, the first mark M1 is uniformly and entirely colored black. Hence, the detection signal level LV1 when the reflection sensor 11 detects the first mark M1 does not change even though the white level of the release material layer 3*a* decreases. On the other hand, the second mark M2 includes the colored portions (i.e., the black portions) and the uncolored portions (i.e., the portions with the base color of the release material layer 3*a*). Hence, the detection signal level when the reflection sensor 11 detects the second mark M2 varies according to a change in the white level of the release material layer 3*a*. Thus, since the threshold TH is set as described above, the threshold TH is rendered variable in such a manner that the threshold TH is maintained to be approximately 50% of the amount of change in the level LV1 relative to the varying level LV0. Accordingly, even though the white level of the release material layer 3*a* has decreased as described above, it is possible to detect the position of the first mark M1 with substantially the same degree of accuracy as in the normal state (see FIG. 8A) where the white level of the release material layer 3*a* is not reduced. In the example shown in FIGS. 8A to 8D, even in the states shown in FIGS. 8B and 8C, the first mark M1 is detected as being located between the respective corresponding positions of the conveyance distances d1 and d2 of the label sheet 3A, in substantially the same manner as in the state shown in FIG. 8A.

Next, an explanation will be provided of a case where the print densities of the first mark M1 and the second mark M2 change. The first marks M1 and the second marks M2 on the label sheet 3A are printed in a unit of roll in a printing process. The print density is controlled in each printing process. Therefore, variations in the print density may occur among individual printing processes. FIGS. 9A to 9C show enlarged views of the first mark M1 and the second mark M2 in a situation where the white level of the release material layer 3*a* does not change, and the print densities of the first mark M1 and the second mark M2 decrease. Further. FIG. 9D shows changes in the level of the detection signal from the reflection sensor 11 detecting the first mark M1 and the second mark M2 in the same situation as above. More specifically, FIG. 9A shows a state in which the print densities of the first mark M1 and the second mark M2 are normal. FIG. 9B shows a state in which the print densities of the first mark M1 and the second mark M2 have become lower than in the state shown in FIG. 9A. FIG. 9C shows a state in which the print densities of the first mark M1 and the second mark M2 have become even lower than in the state shown in FIG. 9B.

In FIG. 9D, a level LV1(A) is a minimum level of the detection signal when the reflection sensor 11 detects the first mark M1 in the state (see FIG. 9A) in which the print densities of the first mark M1 and the second mark M2 are normal. A level LV1(B) is a minimum level of the detection signal when the reflection sensor 11 detects the first mark M1 in the state (see FIG. 9B) in which the print densities of the first mark M1 and the second mark M2 have become lower. A level LV1(C) is a minimum level of the detection signal when the reflection sensor 11 detects the first mark M1 in the state (see FIG. 9C) in which the print densities of the first mark M1 and the second mark M2 have become even lower than in the state shown in FIG. 9B. Likewise, a level LV2(A) is a minimum level of the detection signal when the reflection sensor 11 detects the second mark M2 in the state (see FIG. 9A) in which the print densities of the first mark M1 and the second mark M2 are normal. A level LV2(B) is a minimum level of the detection signal when the reflection sensor 11 detects the second mark M2 in the state (see FIG. 9B) in which the print densities of the first mark M1 and the second mark M2 have become lower. A level LV2(C) is a minimum level of the detection signal when the reflection sensor 11 detects the second mark M2 in the state (see FIG. 9C) in which the print densities of the first mark M1 and the second mark M2 have become even lower than in the state shown in FIG. 9B.

As shown in FIGS. 9A to 9D, as the print densities of the first mark M1 and the second mark M2 decrease, the detection signal level when the reflection sensor 11 detects each of the first and second marks M1 and M2 becomes higher. As a result, if the threshold TH (which is equal to the level LV2(A)) set in the state shown in FIG. 9A is used as is when the print densities of the first mark M1 and the second mark M2 have decreased, false detection will occur. For instance, in the state shown in FIG. 9A, the first mark M1 is detected as being located between the respective corresponding positions of the conveyance distances d1 and d2. Meanwhile, in the state shown in FIG. 9B, the detection signal level when the reflection sensor 11 detects each of the first and second marks M1 and M2 becomes higher. Therefore, the first mark M1 is detected as being located between respective corresponding positions of conveyance distances d1' and d2', to be displaced from the actual position. Furthermore, in the state shown in FIG. 9C, the detection signal level when the reflection sensor 11 detects each of the first and second marks M1 and M2 is even higher than in the state shown in FIG. 9B. Therefore, the first mark M1 is detected as being located between respective corresponding positions of conveyance distances d1" and d2", to be displaced from the actual position of the first mark M1. Additionally, in the state shown in FIG. 9C, a level difference between the threshold TH (which is equal to the level LV2(A)) and the level LV1(C) is small. Therefore, it might be impossible to detect the position of the first mark M1.

In the illustrative embodiment, the controller 210 sets the threshold TH to the level LV2(A) in the state shown in FIG. 9A. The controller 210 sets the threshold TH to the level LV2(B) in the state shown in FIG. 9B. The controller 210 sets the threshold TH to the level LV2(C) in the state shown in FIG. 9C. As described above, the print density is controlled in each printing process. Therefore, even if there are variations in the print density among individual printing processes, the first marks M1 and the second marks M2 printed on the label sheet 3A in the same printing process will be darker or lighter together to substantially the same degree. In other words, the first marks M1 and the second marks M2 printed on the label sheet 3A of the same roll may be considered to be formed with substantially the same density. On the other hand, in the example shown in FIGS. 9A to 9D, the detection signal level LV0 when the reflection sensor 11 detects the base color of the release material layer 3A does not change. Thus, since the threshold TH is set as described above, the threshold TH is rendered variable in such a manner that the threshold TH is maintained to be approximately 50% of the amount of change in the varying level LV1 relative to the level LV0. Therefore, even when the print densities of the first mark M1 and the second mark M2 become lower as described above, it is possible to detect the position of the first mark M1 with substantially the same level of accuracy as in the state (see FIG. 9A) where the print densities of the first mark M1 and the second mark M2 are normal. In the example shown in FIGS. 9A to 9D, even in the states shown in FIGS. 9B and 9C, the first mark M1 is detected as being located between the respective corresponding positions of the conveyance distances d1 and d2 of the label sheet 3A, in substantially the same manner as in the state shown in FIG. 9A.

Next, an explanation will be provided of a case where the white level of the base color of the release material layer 3*a* of the label sheet 3A increases. For instance, the white level of the release material layer 3*a* may be unexpectedly higher due to the use of glossy paper as the release material layer 3*a*, changes in the material, the manufacturing process, or the manufacturer of the release layer 3*a*, or an increase in the reflectivity of the release material layer 3*a* due to the release material layer 3*a* being thicker. FIGS. 10A and 10B show enlarged views of the first mark M1 and the second mark M2 in a situation where the print densities of the first mark M1 and the second mark M2 do not change, and the white level of the release material layer 3*a* increases. Further, FIG. 10C shows changes in the level of the detection signal from the reflection sensor 11 detecting the first mark M1 and the second mark M2 in the same situation as above. More specifically. FIG. 10A shows a normal state in which the white level of the release material layer 3*a* is not raised. FIG. 10B shows a state in which the white level of the release material layer 3*a* has become higher than in the state shown in FIG. 10A.

In FIG. 10C, the level LV0(A) is a detection signal level when the reflection sensor 11 detects the base color of the release material layer 3*a* in the state (see FIG. 10A) in which the white level of the release material layer 3*a* is not raised. The level LV0(B) is a detection signal level when the reflection sensor 11 detects the base color of the release material layer 3*a* in the state (see FIG. 10B) in which the white level of the release material layer 3*a* has become higher. It is noted that when a maximum output of the detection signal from the reflection sensor 11 is set to the level LV0(A), the level LV0(B) is a saturated level of the detection signal output from the reflection sensor 11. The level LV1(A) is a minimum level of the detection signal when the reflection sensor 11 detects the first mark M1 in the state (see FIG. 10A) in which the white level of the release material layer 3*a* is not raised. The level LV1(B) is a minimum level of the detection signal when the reflection sensor 11 detects the first mark M1 in the state (see FIG. 10B) in which the white level of the release material layer 3*a* has become higher. Likewise, the level LV2(A) is a minimum level of the detection signal when the reflection sensor 11 detects the second mark M2 in the state (see FIG. 10A) in which the white level of the release material layer 3*a* is not raised. The level LV2(B) is a minimum level of the detection signal when the reflection sensor 11 detects the second mark M2 in the state (see FIG. 10B) in which the white level of the release material layer 3*a* has become higher.

As shown in FIGS. 10A to 10C, as the white level of the release material layer 3*a* increases, the detection signal level when the reflection sensor 11 detects the base color of the release material layer 3*a* becomes higher. As a result, if the threshold TH (which is equal to the level LV2(A)) in the state shown in FIG. 10A is used as is when the white level of the release material layer 3*a* has become higher, false detection will occur. For instance, in the state shown in FIG. 10A, the first mark M1 is detected as being located between the respective corresponding positions of the conveyance distances d1 and d2. Meanwhile, in the state shown in FIG. 10B, the detection signal level when the reflection sensor 11 detects the base color of the release material layer 3*a* becomes higher. Therefore, the first mark M1 is detected as being located between respective corresponding positions of conveyance distances d1' and d2', to be displaced from the actual position of the first mark M1.

In the illustrative embodiment, the controller 210 sets the threshold TH to the level LV2(A) in the state shown in FIG. 10A, and sets the threshold TH to the level LV2(B) in the state shown in FIG. 10B. As described above, the first mark M1 is uniformly and entirely colored black. Hence, the detection signal level LV1 when the reflection sensor 11 detects the first mark M1 changes little even though the white level of the release material layer 3*a* increases. On the other hand, the second mark M2 includes the colored portions (i.e., the black portions) and the uncolored portions (i.e., the portions with the base color of the release material layer 3*a*). Hence, the detection signal level LV2 when the reflection sensor 11 detects the second mark M2 increases significantly as the white level of the release material layer 3*a* increases. Therefore, by setting the threshold TH as described above, as long as the level LV2 (B) is not even saturated, it is possible to detect the position of the first mark M1 with substantially the same accuracy as in the normal state (see FIG. 10A) in which the white level of the release material layer 3*a* is not raised, even when the white level of the release material layer 3*a* is raised and saturated as mentioned above. In the example shown in FIGS. 10A to 10C, even in the state shown in FIG. 10B, the first mark M1 is detected as being located between the respective corresponding positions of the conveyance distances d1 and d2, in substantially the same manner as in the state shown in FIG. 10A.

FIG. 11 shows a procedure of a control process to be performed by the controller 210 to produce a printed label T. The control process shown in FIG. 11 may be performed by the CPU 210A of the controller 210 executing one or more programs 210*b* stored in the ROM 210B.

As shown in FIG. 11, in S5, the controller 210 reads print information, for instance, from an operation terminal via the communication circuit 211B. The print information represents an image (e.g., characters) to be printed on a label 3B of the label sheet 3A by the thermal head 31.

In S10, the controller 210 drives the platen roller driving motor 208 via the platen roller drive circuit 209, thereby driving the platen roller 26 to start conveying the label sheet 3A.

In S15, the controller 210 receives a detection signal from the reflection sensor 11 that has detected the second mark M2.

In S20, the controller 210 performs the threshold setting process to set a threshold for identifying the position of the first mark M1 to be variable based on a level of the detection signal received in S15 from the reflection sensor 11 having detected the second mark M2.

In S25, the controller 210 receives a detection signal from the reflection sensor 11 that has detected the first mark M1.

In S30, the controller 210 performs the position identification process to identify a position of the first mark M1 based on a result of comparison between the level of the detection signal received in S25 from the reflection sensor 11 having detected the first mark M1 and the threshold set in S20.

In S35, the controller 210 determines whether the label sheet 3A has been conveyed to a particular print start position. Specifically, the controller 210 determines whether a conveyance distance from the detection position of the first mark M1 as identified in S30 has reached a particular conveyance distance. The controller 210 repeatedly makes the determination in S35 while waiting until the label sheet 3A is conveyed to the print start position (S35: No). The controller 210 goes to S40 when determining that the label sheet 3A has been conveyed to the print start position (S35: Yes).

In S40, the controller 210 sends a control signal to the thermal head 31 via the print drive circuit 205. Thereby, the controller 210 performs printing to form, on the heat-sensitive layer 3*ca*, the image (e.g., characters) corresponding to the print information read in S5.

In S45, the controller 210 determines whether the label sheet 3A has been conveyed over a particular print area length. Specifically, the controller 20 determines whether the conveyance of the label sheet 3A over the print area length has been completed, based on the conveyance distance from the detection position of the first mark M1 as identified in S30. The controller 210 repeatedly makes the determination in S45 while waiting until the conveyance of the label sheet 3A over the print area length is completed (S45: No). The controller 210 goes to S50 when determining that the conveyance of the label sheet 3A over the print area length has been completed (S45: Yes).

In S50, the controller 210 stops supplying electricity to the thermal head 31 via the print drive circuit 205, thereby stopping the printing on the label sheet 3A.

In S55, the controller 210 stops driving the platen roller driving motor 208 via the platen roller drive circuit 209, thereby stopping the rotation of the platen roller 26. As a result, the conveyance of the label sheet 3A is stopped.

In S60, the controller 210 sends a lighting control signal to the LED display 34. Thereby, the LED display 34 shows thereon that the label sheet 3A is ready to be cut by manually operating the cutter lever 9.

In S65, the controller 210 determines whether a cutting operation of cutting the label sheet 3A by operating the cutter lever 9 has been completed. The controller 210 repeatedly makes the determination in S65 while waiting until the cutting operation is completed (S65: No). The controller 210 terminates the process shown in FIG. 11 when determining that the cutting operation has been completed (S65: Yes).

As described above, in the illustrative embodiment, the first marks M1 and the second marks M2 are printed on the surface of the release material layer 3*a* side of the label sheet 3A. As mentioned above, when the first marks M1 and the second marks M2 are printed on the label sheet 3A held by the same holder 3, the first marks M1 and the second marks M2 are printed in the same printing process. Thus, for instance, even if there are variations in the print density among individual printing processes, the first marks M1 and the second marks M2 printed on the label sheet 3A in the same printing process will be darker or lighter together to substantially the same degree. In other words, the first marks M1 and the second marks M2 printed on the same label sheet 3A may be considered to be printed with substantially the same density. In the threshold setting process of the illustrative embodiment, using the above properties, the threshold TH of the detection signal level for detecting the first mark M1 is determined based on the detection signal level when the second mark M2 is detected.

For instance, if the first mark M1 is printed lighter in color (i.e., with a density lower than a normal density), the detection signal level when the reflection sensor 11 detects the first mark M1 will be a level when the first mark M1 has a reflectivity higher than when printed as usual (i.e., with the normal density). Namely, in this case, the sensor voltage when the reflection sensor 11 detects the first mark M1 is higher than when the first mark M1 is printed with the normal density. As a result, if the threshold TH set when the printing is performed with the normal density is used as is when the printing is performed with a lower density, false detection may occur such as the first mark M1 being detected to be located in a position displaced from the actual position or being unable to be detected. At this time, the second mark M2 is also printed with such a lower density. Therefore, the detection signal level when the reflection sensor 11 detects the second mark M2 is a level when the second mark M2 has a reflectivity higher than when printed with the normal density. Thereby, it is possible to set the threshold TH to be shifted toward a level for the first mark M1 having a reflectivity higher than when the printing is performed with the normal density, based on the detection signal level for the second mark M2. Accordingly, even though the printing is performed with a lower density as described above, it is possible to identify the position of the first mark M1 with substantially the same degree of accuracy as when the printing is performed with the normal density, in the position identification process to identify the position of the first mark M1 based on a result of comparison between the detection signal level and the threshold TH.

Conversely, if the first mark M1 is printed darker in color (i.e., with a density higher than the normal density), the detection signal level when the reflection sensor 11 detects the first mark M1 will be a level when the first mark M1 has a reflectivity lower than when printed as usual (i.e., with the normal density). Namely, in this case, the sensor voltage when the reflection sensor 11 detects the first mark M1 is lower than when the first mark M1 is printed with the normal density. As a result, if the threshold TH set when the printing is performed with the normal density is used as is when the printing is performed with a higher density, the first mark M1 may be detected to be located in a position displaced from the actual position. At this time, the second mark M2 is also printed with such a higher density. Therefore, the detection signal level when the reflection sensor 11 detects the second mark M2 is a level when the second mark M2 has a reflectivity lower than when printed with the normal density. Thereby, it is possible to set the threshold TH to be shifted toward a level for the first mark M1 having a reflectivity lower than when the printing is performed with the normal density, based on the detection signal level for the second mark M2. Accordingly, even though the printing is performed with a higher density as described above, it is possible to identify the position of the first mark M1 with substantially the same degree of accuracy as when the printing is performed with the normal density.

On the other hand, if the print densities of the first mark M1 and the second mark M2 do not change, and the reflectivity of the base color of the label sheet 3A becomes lower, the detection signal level when the reflection sensor 11 detects the base color will be a level when the base color of the label sheet 3A has a reflectivity lower than its normal reflectivity. Namely, in this case, the sensor voltage when the reflection sensor 11 detects the first mark M1 is lower than when the reflectivity of the base color of the label sheet 3A is normal. As a result, if the threshold TH set when the reflectivity of the base color of the label sheet 3A is normal is used as is when the reflectivity of the base color of the label sheet 3A is lower, false detection may occur such as the first mark M1 being detected to be located in a position displaced from the actual position or being unable to be detected. At this time, the detection signal level when the reflection sensor 11 detects the second mark M2 is also a level when the base color of the label sheet 3A has a reflectivity lower than its normal reflectivity. Thereby, it is possible to set the threshold TH to be shifted toward a level for the base color of the label sheet 3A having a reflectivity lower than its normal reflectivity, based on the detection signal level for the second mark M2. Accordingly, even though the reflectivity of the base color of the label sheet 3A has become lower as described above, it is possible to identify the position of the first mark M1 with substantially the same degree of accuracy as when the reflectivity of the base color of the label sheet 3A is normal.

Conversely, if the print densities of the first mark M1 and the second mark M2 do not change, and the reflectivity of the base color of the label sheet 3A becomes higher, the detection signal level when the reflection sensor 11 detects the base color will be a level when the base color of the label sheet 3A has a reflectivity higher than its normal reflectivity. As a result, if the threshold TH set when the reflectivity of the base color of the label sheet 3A is normal is used as is when the reflectivity of the base color of the label sheet 3A is higher, the first mark M1 may be detected to be located in a position displaced from the actual position. At this time, the detection signal level when the reflection sensor 11 detects the second mark M2 is also a level when the base color of the label sheet 3A has a reflectivity higher than its normal reflectivity. Thereby, it is possible to set the threshold TH to be shifted toward a level for the base color of the label sheet 3A having a reflectivity higher than its normal reflectivity, based on the detection signal level for the second mark M2. Accordingly, even though the reflectivity of the base color of the label sheet 3A has become higher as described above, it is possible to identify the position of the first mark M1 with substantially the same degree of accuracy as when the reflectivity of the base color of the label sheet 3A is normal.

As a result, in the illustrative embodiment, even though there are variations in the print densities of the first mark M1 and the second mark M2 on the label sheet 3A and in the reflectivity of the label sheet 3A, it is possible to detect the position of the first mark M1 with high accuracy without being affected by those variations.

Further, in the illustrative embodiment, particularly, an amount of light received by the light receiving element when the reflection sensor 11 detects the second mark M2 is larger than when the reflection sensor 11 detects the first mark M1.

Thereby, the detection signal level when the reflection sensor 11 detects the second mark M2 may be considered as such a level that the second mark M2 has a reflectivity higher than the reflectivity of the first mark M1. As a result, it is possible to set the detection signal level for the second mark M2 as the threshold TH of the detection signal level for detecting the first mark M1, and thus, to easily set the threshold TH.

Further, in the illustrative embodiment, particularly, the coloring ratio (i.e., the ratio of the area of the portion(s) colored black to the whole area) of the second mark M2 is smaller than the coloring ratio of the first mark M1.

Thereby, it is possible to adjust the threshold TH of the detection signal level for detection of the first mark M1 to be an appropriate value according to the coloring ratio of the second mark M2. Further, the second mark M2 may include a colored portion (e.g., a portion colored black) and a portion with the base color of the label sheet 3A. As a result, when the reflectivity of the base color portion of the label sheet 3A becomes higher or lower, the detection signal level for the second mark M2 varies according to the variation in the reflectivity of the base color portion. Thus, it is possible to set the threshold TH to be variable according to the variation in the reflectivity of the base color portion. Accordingly, it is possible to detect the position of the first mark M1 with high accuracy without being affected by the variation in the reflectivity of the label sheet 3A.

Further, in the illustrative embodiment, particularly, the first mark M1 is a mark colored uniformly and entirely. The second mark M2 is a mark colored in the striped pattern.

Thereby, it is possible to set the coloring ratio of the second mark M2 with high accuracy in accordance with the line width Ws and the pitch of the striped pattern, with respect to the coloring ratio (i.e., 100%) of the first mark M1 that is colored uniformly and entirely.

Further, in the illustrative embodiment, particularly, the line width Ws of the striped pattern of the second mark M2 is equal to or less than half of the length Wm of the first mark M1 in the sheet longitudinal direction.

In general, the length Wm of the first mark M1 in the sheet longitudinal direction is set to be equal to or more than the spot diameter of the reflection sensor 11. Therefore, when the line width Ws of the striped pattern of the second mark M2 is set to be equal to or less than half of the length Wm of the first mark M1 in the sheet longitudinal direction, the reflection sensor 11, when detecting the second mark M2, outputs a detection signal with a gentle waveform. Thereby, it is possible to improve the accuracy for setting the threshold TH.

Further, the label sheet 3A of the illustrative embodiment provides the following advantageous effects. In general, when marks for position detection are printed on the label sheet 3A as a printing medium, it is necessary to control the print densities of the marks. This is because, for instance, if the densities of the marks become lower, the level of the detection signal output from the reflection sensor 11 detecting the marks may be equal to or more than the threshold TH, thereby causing false detection. However, the accurate densities of the marks need to be measured by a densitometer, for instance, in a process separate from the printing process. Therefore, in this case, there are problems as follows. It takes time to measure the densities by the densitometer since the measurement has to be performed offline after stopping the printing process. Further, it is not possible to measure the densities of all the printed marks. Further, more ink than necessary is used because, in most cases, the densities are controlled using results of the density measurement at the beginning and the end of the printing process, and a target print density is set with a margin in consideration of density variations (which may include a variation due to measurement errors). Moreover, since the density of each printed mark varies depending on how dried the ink of each printed mark is, it takes time to check whether each examined mark satisfies the required density.

Therefore, in the illustrative embodiment, the first mark M1 colored uniformly and entirely and the second mark M2 colored in the striped pattern are formed to be spaced apart from each other in the sheet longitudinal direction. Thereby, the label producing apparatus 1 is enabled to determine the threshold TH of the detection signal level to be used for detection of the first mark M1, based on the detection signal level when the reflection sensor 11 detects the second mark M2. In this case, the first mark M1 and the second mark M2 are printed with substantially the same density, since the first mark M1 and the second mark M2 are formed in positions close to each other in the same printing process. Therefore, the threshold TH may be adjusted to an appropriate value according to the coloring ratios of the first mark M1 and the second mark M2, regardless of the print density. Further, since the first mark M1 is formed as a mark colored uniformly and entirely, and the second mark M2 is formed as a mark colored in the striped pattern, it is possible to accurately set the coloring ratios of the first and second marks M1 and M2 according to the line width Ws and the pitch of the striped pattern of the second mark M2. As a result, even though there are variations in the print densities of the first marks M1 and the second marks on the label sheet 3A, it is possible to detect the position of each first mark M1 with high accuracy without being affected by the density variations, and to prevent false detection.

Thus, since strict control of the print densities is unnecessary, it is possible to omit the offline measurement of the print densities or reduce the frequency of the density measurement. Further, the coloring ratios of the first mark M1 and the second mark M2 have only to be within respective specified ranges. Hence, a pass/fail judgment may be made, for instance, using an imaging device such as a camera. Therefore, the pass/fail judgment may be made in-line in the printing process, thereby enabling inspection of all the printed marks. As a result, it is possible to avoid undesirable situations such as the printing process being stopped halfway to perform the offline measurement of the densities and occurrence of a lot defect due to a mark out of standards being found at the end of the printing process.

Further, in the illustrative embodiment, the distance D between the first mark M1 and the second mark M2 in the sheet longitudinal direction is equal to or more than the length Wm of the first mark M1 in the sheet longitudinal direction.

In general, the length Wm of the first mark M1 in the sheet longitudinal direction is set equal to or more than the spot diameter of the reflection sensor 11 of the label producing apparatus 1. Therefore, when the distance D between the first mark M1 and the second mark M2 in the sheet longitudinal direction is set equal to or more than the length Wm of the first mark M1 in the sheet longitudinal direction, the said distance D is set equal to or more than the spot diameter of the reflection sensor 11. Thereby, the level of the detection signal from the reflection sensor 11 is restored to the detection signal level when the reflection sensor 11 detects the base color of the label sheet 3A, during a period of time from when the reflection sensor 11 detects the second mark M2 until when the reflection sensor 11 detects the first mark M1. Consequently, it is possible to render neat the waveform of the detection signal from the reflection sensor 11 detecting the first mark M1 and improve the accuracy for detecting the position of the first mark M1.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

(1) Different Striped Patterns for the Second Mark

In the aforementioned illustrative embodiment, the striped pattern of the second mark M2 is formed with a plurality of black straight lines substantially perpendicular to the sheet conveyance direction being arranged parallel to each other at intervals of a particular pitch. However, the striped pattern may be other patterns than the pattern as exemplified in the illustrative embodiment. For instance, as shown in FIG. 12, the striped patter may be formed with a plurality of black straight lines inclined at a particular angle (e.g., 45 degrees) relative to the sheet conveyance direction being arranged parallel to each other at intervals of a particular pitch. In another instance, as shown in FIG. 13, the striped patter may be formed with a plurality of black straight lines substantially parallel to the sheet conveyance direction being arranged parallel to each other at intervals of a particular pitch. In yet another instance, as shown in FIG. 14, the striped pattern may be formed with a plurality of black straight lines substantially perpendicular to the sheet conveyance direction and a plurality of black straight lines substantially parallel to the sheet conveyance direction being arranged crossing each other (i.e., arranged in a grid pattern).

In any of the above modifications of the second mark M2, a line width Ws and the pitch of the striped pattern are set such that the coloring ratio of the second mark M2 is approximately 50%, in substantially the same manner as in the aforementioned illustrative embodiment. Further, the line width Ws of the striped pattern of the second mark M2 is equal to or less than half of the length Wm of the first mark M1 in the sheet longitudinal direction. Further, a distance D between the first mark M1 and the second mark M2 in the sheet longitudinal direction is set to be equal to or more than the length Wm of the first mark M1 in the sheet longitudinal direction.

Each of the lines included in the striped pattern is not limited to a straight line, but may be a bent line or a curved line, and the lines may be arranged not to be parallel to each other. Each of the lines included in the striped pattern may not necessarily be uniform in thickness. For instance, each of the lines included in the striped pattern may be an elongated area.

The above modifications also produce substantially the same effects as in the aforementioned illustrative embodiment.

(2) When the Second Mark is Colored in a Dot Pattern

In the aforementioned illustrative embodiment, the second mark M2 is colored in the striped pattern. However, for instance, the second mark M2 may be colored black in a dot pattern. The "dot pattern" may be formed with a plurality of dots being arranged regularly or irregularly. Each of the dots included in the "dot pattern" may be formed in any shape, for instance, a rectangle, a parallelogram, a circle, or other shapes. For instance, as shown in FIG. 15, the dot pattern may be formed with a plurality of dots formed substantially in a rectangular shape being arranged in a staggered manner at intervals of a particular pitch. In another instance, as shown in FIG. 16, the dot pattern may be formed with a plurality of dots formed substantially in a parallelogram shape being arranged in parallel at intervals of a particular pitch. In yet another instance, as shown in FIG. 17, the dot pattern may be formed with a plurality of dots formed substantially in a round shape being arranged in a staggered manner at intervals of a particular pitch.

In any of the above modifications of the second mark M2, a dot width Wd and the pitch of the dot pattern are set such that the coloring ratio of the second mark M2 is approximately 50%, in substantially the same manner as in the aforementioned illustrative embodiment. In addition, the dot width Wd of the dot pattern of the second mark M2 is equal to or less than half of the length Wm of the first mark M1 in the sheet longitudinal direction. Further, a distance D between the first mark M1 and the second mark M2 in the sheet longitudinal direction is set to be equal to or more than the length Wm of the first mark M1 in the sheet longitudinal direction.

Each of the dots included in the dot pattern is not limited to the dots shaped as above, but may be formed in any other shape. Further, the dots may be arranged in contact with each other, or may be spaced apart from each other. The arrangement of the dots is not limited to the parallel arrangement or the staggered arrangement, but the dots may be arranged, for instance, irregularly.

The above modifications also produce substantially the same effects as in the aforementioned illustrative embodiment.

(3) When Both the First Mark and the Second Mark have a Striped Pattern or a Dot Pattern In the aforementioned illustrative embodiment, the first mark 1 is uniformly and entirely colored black, and the second mark M2 is colored in the striped pattern. However, for instance, both the first mark M1 and the second mark M2 may be colored in a striped pattern or a dot pattern.

For instance, as shown in FIG. 18, each of the first and second marks M1 and M2 may be formed with a plurality of black straight lines substantially perpendicular to the sheet conveyance direction being arranged parallel to each other at intervals of a particular pitch. In this case, the coloring ratio of the second mark M2 is lower than the coloring ratio of the first mark M1. In this modification, a line width Ws1 and the pitch of the first mark M1 and a line width Ws2 and the pitch of the second mark M2 are set in such a manner that the coloring ratio (e.g., 40%) of the second mark M2 is approximately half of the coloring ratio (e.g., 80%) of the first mark M1. In addition, the line width Ws1 of the first mark M1 is larger than the line width Ws2 of the second mark M2. Further, both of the line widths Ws1 and Ws2 are equal to or less than half of the length Wm of the first mark M1 in the sheet longitudinal direction. Furthermore, a distance D between the first mark M1 and the second mark M2 in the sheet longitudinal direction is set to be equal to or more than the length Wm of the first mark M1 in the sheet longitudinal direction.

Further, for instance, as shown in FIG. 19, each of the first and second marks M1 and M2 may be formed with a plurality of dots formed substantially in a rectangular shape being arranged in a staggered manner at intervals of a particular pitch. In this case, the coloring ratio of the second mark M2 is lower than the coloring ratio of the first mark M1. In this modification, a dot width Wd1 and the pitch of the first mark M1 and a dot width Wd2 and the pitch of the second mark M2 are set in such a manner that the coloring ratio (e.g., 40%) of the second mark M2 is approximately half of the coloring ratio (e.g., 80%) of the first mark M1. In addition, the dot width Wd1 of the first mark M1 is larger than the dot width Wd2 of the second mark M2. Further, both of the dot widths Wd1 and Wd2 are equal to or less than half of the length Wm of the first mark M1 in the sheet longitudinal direction. Furthermore, a distance D between the first mark M1 and the second mark M2 in the sheet longitudinal direction is set to be equal to or more than the length Wm of the first mark M1 in the sheet longitudinal direction.

The coloring ratio of the second mark M2 is not limited to approximately half of the coloring ratio of the first mark M1, but may be another ratio. However, as described above, the threshold TH for detecting the first mark M1 is set based on the detection signal level when the reflection sensor 11 detects the second mark M2. Therefore, the coloring ratio of the second mark M2 is preferred to be around half (e.g., 40% to 60%) of the coloring ratio of the first mark M1, in such a manner as to set the threshold TH to be around half of the detection signal level when the reflection sensor 11 detects the first mark M1 and to more certainly prevent false detection of the first mark M1.

Although the following features are not shown in any drawing, for instance, a mark (e.g., the first mark M1) colored in a striped pattern and a mark (e.g., the second mark M2) colored in a dot pattern may be mixed.

The above modifications may also produce substantially the same effects as in the aforementioned illustrative embodiment. In the present modifications, each of the first mark M1 and the second mark M2 is colored in a striped pattern or a dot pattern. Thereby, it is possible to accurately set the respective coloring ratios of the first mark M1 and the second mark M2 in accordance with the line widths Ws1 and Ws2 and the pitches of the respective striped patterns of the first mark M1 and the second mark M2 or the dot widths Wd1 and Wd2 and the pitches of the respective dot patterns of the first mark M1 and the second mark M2.

In the present modifications, particularly, the coloring ratio of the second mark M2 is preferred to be approximately 50% of the coloring ratio of the first mark M1 or within a range of 40% to 60% of the coloring ratio of the first mark M1. Thereby, it is possible to set the threshold TH for detecting the first mark M1 to be around half of the detection signal level LV1 when the reflection sensor 11 detects the first mark M1, based on the detection signal level LV2 when the reflection sensor 11 detects the second mark M2. Therefore, it is possible to more certainly prevent false detection of the first mark M1.

(4) When Three or More Types of Marks are Formed

In the aforementioned illustrative embodiment, the two types of marks, i.e., the first mark(s) M1 and the second mark(s) M2 are formed on the label sheet 3A. However, the number of the types of the marks is not limited to two, but may be three or more.

For instance, in FIG. 20, three types of marks including a first mark M1, a second mark M2, and a third mark M3 are printed on the surface of the release material layer 3*a* side of the label sheet 3A. The second mark M2 is formed downstream of the first mark M1 in the sheet conveyance direction. The third mark M3 is formed further downstream of the second mark M2 in the sheet conveyance direction. The first mark M1 is colored black uniformly and entirely. The second mark M2 is colored black in a striped pattern. The third mark M3 is colored black in a dot pattern. In this modification, the coloring ratio of the first mark M1 is 100%. Meanwhile, with respect to the second mark M2, a line width Ws and a pitch of the striped pattern thereof are set in such a manner that the coloring ratio of the second mark M2 is approximately 50%. Similarly, with respect to the third mark M3, a dot width Wd and a pitch of the dot pattern thereof are set in such a manner that the coloring ratio of the third mark M3 is approximately 50%.

The line width Ws of the striped pattern of the second mark M2 is equal to or less than half of the length Wm of the first mark M1 in the sheet longitudinal direction. In addition, a distance D between the first mark M1 and the second mark M2 in the sheet longitudinal direction is set to be equal to or more than the length Wm of the first mark M1 in the sheet longitudinal direction. Likewise, the dot width Wd of the dot pattern of the third mark M3 is equal to or less than half of the length Wm of the first mark M1 in the sheet longitudinal direction. Further, a distance D between the second mark M2 and the third mark M3 in the sheet longitudinal direction is set to be equal to or more than the length Wm of the first mark M1 in the sheet longitudinal direction.

In this modification, in a threshold setting process, the controller 210 sets the threshold TH to be variable based on a detection signal level when the reflection sensor 11 detects the third mark M3 and a detection signal level when the reflection sensor 11 detects the second mark M2. Specifically, the level of the detection signal from the reflection sensor 11 detecting the third mark M3 is substantially equal to the level of the detection signal from the reflection sensor 11 detecting the second mark M2. Hence, for instance, the controller 210 may calculate an average value of these detection signal levels and set the average value as the threshold TH. Then, in a position identification process, the controller 210 identifies a position of the first mark M1 based on a result of comparison between a detection signal level when the reflection sensor 11 detects the first mark M1 and the threshold TH.

In this modification, as described above, the threshold TH is set using the two types of marks. Therefore, it is possible to set the threshold TH with a higher degree of accuracy than when the threshold TH is set using only one type of mark.

In the above example, both the coloring ratio of the second mark M2 and the coloring ratio of the third mark M3 are set to 50%. However, each of the coloring ratios of the second and third marks M2 and M3 may be a ratio other than 50%. For instance, the coloring ratio of the second mark M2 may be set to 60%, and the coloring ratio of the third mark M3 may be set to 40%. In this case, the controller 210 may calculate an average value of a detection signal level when the reflection sensor 11 detects the second mark M2 and a detection signal level when the reflection sensor 11 detects the third mark M3, and may set the average value as the threshold TH.

In the above descriptions, when there are expressions such as "perpendicular," "parallel." and "flat," these expressions may not necessarily give their rigorous meanings. Namely, the expressions of "perpendicular," "parallel." and "flat" may give meanings of "substantially perpendicular," "substantially parallel," and "substantially flat," respectively, in consideration of tolerances and errors in design and manufacturing.

In the above descriptions, when there are expressions such as "same." "equal." or "different" in terms of dimensions or size in appearances, these expressions may not necessarily give their rigorous meanings. Namely, the expressions of "same," "equal," and "different" may give meanings of "substantially the same." "substantially equal," and "substantially different," respectively, in consideration of tolerances and errors in design and manufacturing.

However, unlike the above, for instance, when there are criteria such as a threshold (see FIG. 11) and a reference value, the expressions of "same," "equal," and "different" in comparison to the criteria give their respective rigorous meanings.

In the above descriptions, each arrow, showing an example of a signal flow in drawings such as FIG. 6, does not limit a direction of the signal flow.

The control process (see FIG. 11) according to aspects of the present disclosure is not limited to the procedure of the flowchart as shown in FIG. 11. The control process according to aspects of the present disclosure is capable of changes or modifications (e.g., addition of one or more steps, deletion of one or more steps, and changes in the order of the steps) within the scope of the inventive concept as expressed herein.

The following shows examples of associations between elements exemplified in the aforementioned illustrative embodiments and modifications and elements according to aspects of the present disclosure. The label producing apparatus 1 may be an example of a "printer" according to aspects of the present disclosure. The label sheet 3A may be an example of a "tape" according to aspects of the present disclosure. The first mark M1 may be an example of a "first mark" according to aspects of the present disclosure. The second mark M2 may be an example of a "second mark"

according to aspects of the present disclosure. The platen roller 26 may be included in a "conveyor" according to aspects of the present disclosure. The thermal head 31 may be an example of a "print head" according to aspects of the present disclosure. The reflection sensor 11 may be an example of a "reflection sensor" according to aspects of the present disclosure. The controller 210 may be an example of a "controller" according to aspects of the present disclosure. The CPU 210A may be an example of a "processor" according to aspects of the present disclosure. The ROM 210B storing the programs 210*b* may be an example of a "memory storing computer-readable instructions" according to aspects of the present disclosure. The CPU 210A and the ROM 210B may be included in the "controller" according to aspects of the present disclosure.

What is claimed is:

1. A printer comprising:

a conveyor configured to convey a tape in a conveyance direction, the tape having a plurality of marks formed thereon, the plurality of marks including a first mark, and a second mark formed downstream of the first mark in the conveyance direction;

a print head configured to print an image on the tape being conveyed by the conveyor;

a reflection sensor configured to detect the plurality of marks on the tape by:

emitting light toward the tape and receiving reflected light from the tape, and generating detection signals over time based on the received reflected light when detecting the plurality of marks, as the tape is conveyed; and outputting the detection signals to a controller; and the controller configured to:

(a) after starting conveying the tape in the conveyance direction by the conveyor, receive a second detection signal, of the detection signals, based on the reflection sensor detecting the second mark, the second detection signal having a level of the second detection signal;

(b) while continuously conveying the tape in the conveyance direction, set a value of a threshold based on the level of the second detection signal when the reflection sensor detects the second mark; and (c) receive a first detection signal, of the detection signals, based on the reflection sensor detecting the first mark, the first detection signal having a level; and (d) identify a position of the first mark based on a result of comparison between the set threshold and the level of the first detection signal when the reflection sensor detects the first mark; and wherein while continuously conveying the tape in the conveyance direction the controller performs processing in the order of: (b) after (a), (c) after (b), and (d) after (c).

2. The printer according to claim 1, wherein an amount of the reflected light received when the reflection sensor detects the second mark is larger than an amount of the reflected light received when the reflection sensor detects the first mark.

3. The printer according to claim 2, wherein a coloring ratio of the second mark is lower than a coloring ratio of the first mark, the coloring ratio of each mark being a ratio of a colored area to a whole area of each mark.

4. The printer according to claim 3, wherein the first mark is colored uniformly and entirely, and wherein the second mark is colored in a striped pattern or a dot pattern.

5. The printer according to claim 4, wherein, when the second mark is colored in the striped pattern, a width of each line included in the striped pattern in a longitudinal direction of the tape is equal to or less than half of a length of the first mark in the longitudinal direction of the tape, and wherein, when the second mark is colored in the dot pattern, a width of each dot included in the dot pattern in the longitudinal direction of the tape is equal to or less than half of the length of the first mark in the longitudinal direction of the tape.

6. The printer according to claim 3, wherein each of the first mark and the second mark is colored in a striped pattern or a dot pattern.

7. The printer according to claim 6, wherein, when the second mark is colored in the striped pattern, a width of each line included in the striped pattern in a longitudinal direction of the tape is equal to or less than half of a length of the first mark in the longitudinal direction of the tape, and wherein, when the second mark is colored in the dot pattern, a width of each dot included in the dot pattern in the longitudinal direction of the tape is equal to or less than half of the length of the first mark in the longitudinal direction of the tape.

8. The printer according to claim 1, wherein the controller includes:

a processor; and a memory storing computer-readable instructions configured to, when executed by the processor, cause the processor to:

set the value of the threshold based on the level of the second detection signal when the reflection sensor detects the second mark; and identify the position of the first mark based on the result of comparison between the set threshold and the level of the first detection signal when the reflection sensor detects the first mark.

9. The printer according to claim 1, the printer further including a platen roller driving motor that drives the conveyor to convey the tape; and the controller configured to control the platen roller driving motor so as to control the conveyor; and the controller configured to start conveying the tape prior to the receiving the second detection signal.

10. The printer according to claim 9, the controller configured to perform processing including:

determining whether the tape has conveyed a predetermined conveyance distance from the position, which was identified, of the first mark; and determining, based on the determining that the tape has conveyed such predetermined conveyance distance, that the tape has moved to a print start position.

11. The printer according to claim 1, the controller configured to perform processing including:

determining whether the tape has conveyed a predetermined conveyance distance from the position, which was identified, of the first mark; and determining, based on the determining that the tape has conveyed such predetermined conveyance distance, that the tape has moved to a print start position.

12. The printer according to claim 1, wherein the controller is configured to set the value of the threshold based on both (a) the level of the second detection signal, and (b) a coloring ratio, and the coloring ratio constituting a value that represents a ratio between a colored area of the second mark to a whole area of the second mark.

13. The printer according to claim 12, wherein the coloring ratio is between 40% and 60%.

* * * * *